US012610202B2

(12) United States Patent
Petersen et al.

(10) Patent No.: US 12,610,202 B2

(45) Date of Patent: Apr. 21, 2026

(54) HEARING AID OR HEARING AID SYSTEM SUPPORTING WIRELESS STREAMING

(71) Applicant: Oticon A/S, Smørum (DK)

(72) Inventors: Svend Oscar Petersen, Smørum (DK); Vijay Kumar Bhat, Smørum (DK); Torsten Kjær Sørensen, Smørum (DK); Rasmus Lund Bendtsen, Smørum (DK); Ross Harvey, Smørum (DK)

(73) Assignee: Oticon A/S, Smørum (DK)

( * ) Notice: Subject to any disclaimer, the term of this patent is extended or adjusted under 35 U.S.C. 154(b) by 289 days.

(21) Appl. No.: 18/475,245

(22) Filed: Sep. 27, 2023

(65) Prior Publication Data

US 2025/0106570 A1 Mar. 27, 2025

(51) Int. Cl.
*H04R 25/00* (2006.01)
*H04S 7/00* (2006.01)

(52) U.S. Cl.
CPC ......... *H04R 25/552* (2013.01); *H04R 25/405* (2013.01); *H04R 25/407* (2013.01); *H04R 25/505* (2013.01); *H04R 25/554* (2013.01); *H04S 7/304* (2013.01); *H04R 2430/01* (2013.01); *H04S 2400/11* (2013.01)

(58) Field of Classification Search
CPC .. H04R 25/552; H04R 25/405; H04R 25/407; H04R 25/505; H04R 25/554; H04R 2430/01; H04R 25/43; H04S 7/304; H04S 2400/11
See application file for complete search history.

(56) References Cited

U.S. PATENT DOCUMENTS

| | | | | |
|---|---|---|---|---|
| 9,986,346 B2 * | 5/2018 | Bendsen | .............. | H04R 25/552 |
| 9,992,587 B2 * | 6/2018 | Farmani | ............... | H04R 25/505 |
| 2010/0172506 A1 | 7/2010 | Iwano | | |
| 2013/0094683 A1 | 4/2013 | Hansen | | |
| 2013/0259237 A1 | 10/2013 | Oesch et al. | | |
| 2014/0348331 A1 | 11/2014 | Gran et al. | | |
| 2015/0003653 A1 | 1/2015 | Recker et al. | | |
| 2015/0189449 A1 | 7/2015 | Udesen | | |
| 2015/0230036 A1 | 8/2015 | Pedersen et al. | | |
| 2016/0234609 A1 * | 8/2016 | Bendsen | .............. | H04R 25/407 |
| 2016/0323678 A1 | 11/2016 | Pontoppidan | | |
| 2018/0041849 A1 * | 2/2018 | Farmani | ............... | H04R 25/405 |
| 2018/0262849 A1 | 9/2018 | Farmani et al. | | |
| 2020/0314562 A1 | 10/2020 | Pedersen et al. | | |

FOREIGN PATENT DOCUMENTS

| | | |
|---|---|---|
| EP | 3013070 | 4/2016 |
| EP | 3185590 | 6/2017 |
| EP | 3270608 | 1/2018 |
| EP | 3285500 | 2/2018 |
| EP | 3373603 | 9/2018 |
| EP | 3477964 | 5/2019 |
| EP | 3716642 | 9/2020 |
| WO | 2010133246 | 11/2010 |

* cited by examiner

*Primary Examiner* — Angelica M McKinney

(57) ABSTRACT

Disclosed herein are embodiments of a binaural hearing aid system. The system includes a position detector providing a position detector control signal indicative of a current position of at least one target sound source relative to the user's head. An input gain controller can be configured to provide relative weight in dependence of the position detector control signal.

27 Claims, 18 Drawing Sheets

HEARING AID OR HEARING AID SYSTEM SUPPORTING WIRELESS STREAMING

TECHNICAL FIELD

Many modern hearing aids support wireless streaming of audio from external sources (e.g. localized in the vicinity of the hearing aid user), such as from a TV adapter connected to the TV for transmitting TV-audio to one or more hearing aids, from remote microphones (partner microphones, table microphones, etc.) and from smartphones. Streaming the audio directly to the hearing aids improves the speech understanding but can degrade the perception of the spatial orientation of the sound sources as well as speech understanding if multiple speakers are present. An increased spatial orientation and possible externalization that spatial audio can yield can give a more natural perception of sound which resembles hearing without streaming from the target source.

Streaming of audio from external devices to one or more hearing aids has been dealt with in a number of references. Some examples are provided in the following.

EP3270608A1 deals with a hearing device comprising a direction estimator configured to estimate a head direction of a user of the hearing device, wherein the hearing device is configured to select and apply a processing scheme in the hearing device based on the estimated head direction.

US2013094683A1 deals with applying directional cues to a streamed signal in a binaural hearing aid system. The direction of arrival can be determined based on delay differences. Directional cues (e.g. HRTFs) may be added to the streamed signal.

EP3716642A1 deals with a hearing system, a hearing device and a multitude of audio transmitters. The hearing device comprises a selector/mixer controlled by a source selection control signal determined in dependence of a comparison of a beamformed signal provided by microphones of the hearing device and streamed sound signals received from audio transmitters in an environment around the user wearing the hearing device.

EP3013070A2 deals with sound source localization in a hearing aid system wherein streamed sound (e.g. from a wireless microphone or a TV adapter) is received by a hearing aid together with acoustically propagated sound from a target sound source. Movements of the head may be detected by a head tracker.

WO2010133246A1 deals with the use in a hearing aid of directional information from an acoustically propagated (target) signal to color a wirelessly propagated (typically cleaner) (target) signal (e.g. by applying HRTFs to the streamed signal). WO2010133246A1 further describes the 'opposite' situation a target signal is estimated based on the acoustically propagated signal, using the wirelessly propagated signal to 'clean' the acoustically propagated signal.

US2015003653A1 deals with determining a position of a hearing aid relative to a streaming source using a sensor, e.g. to track head position/orientation.

US2013259237A1 deals with a hearing assistance system and method for wireless RF audio signal transmission from at least one audio signal source to ear level receivers, wherein a close-to-natural hearing impression is to be achieved. Detects angle of incidence of a wireless signal by comparing signal strengths received at left and right ears (reflecting a current head direction relative to the transmitter) and application of signals at left and right ears reflecting the difference in signal strength.

US2014348331A1 relates to binaural processing in a hearing aid system (applying HRTFs on monaural (streamed) signals based on an orientation of the head of the user relative to the sound source).

SUMMARY

In the following, some problems with the presentation of streaming audio in a hearing aid are outlined.

Example 1: The partner of the hearing aid user wears a partner microphone, but the sound from the partner microphone is usually streamed as a mono signal, and the hearing aid user will experience the sound being presented from within the user's head, and not have a spatial perception of where the partner is placed.

Example 2: The hearing aid user is watching TV and may receive a stereo signal from a TV-adapter, thus experiencing a surround like sound, but if the user turns the head, the sound picture follows the users head and will then no longer be perceived to be externalized. Additionally, if the hearing aid user watching TV would like to listen to another person in the room trying to get the user's attention, then when the user turns the head towards the other person then the streamed sound from the TV will "follow" the user and disturb the user's ability to hear the other person.

Example 3: In a conference call with multiple speakers, the sound from the far end speaker will be presented as a mono signal in both hearing aids, making it more difficult for the hearing aid user to separate the multiple speakers.

Example 4: With many different spoken notifications available in a hearing aid user interface, it can be difficult to distinguish the many different notifications from each other. By externalizing spoken notifications (i.e. by assigning each notification to a different point in space) the understanding and recognition of notifications might increase (especially during tougher listening environments, even if it is not possible to fully hear the notification it might be recognized based on the point of origin).

Example 5: Streamed sound sources can be placed at a given proximity to the user based on the distance between the user and the streaming source to provide the user with better spatial depth perception. For applications like streaming of TV-sound, it might be beneficial to be able to attenuate and change the streamed source volume based on distance between the streaming device (e.g. TV) and the user wearing the hearing aid). This will both create a natural feeling of the incoming sound but also provide the ability to seamlessly turn up/down the streamed source (and vice versa the hearing aid output) when moving around the room and to attend the hearing aid output sound (based on input from microphones of the hearing aid) in certain situations without having to pause/resume the streamed signal source. A distance between transmitting and receiving devices may e.g. be estimated by detecting a received signal strength in the receiving device and receiving a transmitted signal strength from the transmitting device. The Bluetooth parameter 'High Accuracy Distance Measurement' (HADM) may likewise be used.

Example 6: In a classroom with hearing impaired students, and multiple teachers with microphones, it can be difficult for the hearing-impaired student to locate and/or separate the multiple streamed microphone signals.

Our co-pending European patent application number EP23199298.3, entitled "A hearing aid comprising a wireless audio receiver and an own-voice detector", filed with the European Patent Office on 25 Sep. 2023, and dealing with a strategy for (automatically) controlling the gain applied to a hearing aid microphone input when a direct audio input is received is incorporated herein by reference.

In the present disclosure it is proposed to make a solution for the hearing aid user that can ensure that streamed audio signals are presented to the user according to one or more of the following:

- In the correct position (e.g. direction and/or distance to) in space.
- With tracking of the user's head in order to externalize the streamed sound even further.
- With added reverberation that externalizes the sound while keeping speech understanding. This may e.g. be achieved using the Bluetooth distance measure (HADM).) Added reverberation may also be based on desired room acoustics.
- With additional gain to enhance desired signal based on the user's head orientation, thereby letting the user control what to hear simply by turning the head.
- With additional gain to enhance desired signal based on the user's proximity to the streaming source.

When humans in general try to localize sounds it can help to turn the head in order to detect small changes in latency and level difference between the ears as well as the spectral shaping of the incoming sound. Additionally, it can also help to turn the head to hear another person better, since the right ear is more sensitive to sounds arriving from 30-60 degrees to the right compared to straight ahead for the right ear. Finally, the human brain can cognitively easier separate multiple speakers if they are separated in space compared to collocated speakers. The present disclosure attempts to utilize (at least some of) these effects to enhance the user's spatial awareness and/or to improve speech understanding. Furthermore, the embodiments of the disclosure may allow hearing aid users to temporarily disengage from the audio stream and focus on hearing aid microphone input without having to stop or disconnect the active stream. This will provide the user with more seamless interaction with streaming sources. Implementation of the feature may be based on activity data like walking, distance measures such as Bluetooth signal strength or HADM (High Accuracy Distance Measurement), relative head direction compared to the signal source direction or amount of head turn in general (head is still→stream sound increased, high amount of head turn→HA sound increased).

A Binaural Hearing Aid System:

In an aspect of the present application, a binaural hearing aid system is provided. The binaural hearing aid system comprises first and second hearing aids adapted for being located at or in left and right ears, respectively, of a user. Each of the first and second hearing aids comprises an input transducer for converting an acoustically propagated signal impinging on said input transducer to an electric sound input signal comprising a target signal from at least one target sound source and other signals from possible other sound sources in an environment around the user. At least one, e.g. each, of the first and second hearing aids further comprises a wireless receiver for receiving a wirelessly transmitted signal from an audio transmitter and for retrieving therefrom a streamed audio input signal comprising a target signal from at least one target sound source and optionally other signals from other sound sources in the environment around the audio transmitter. Each of the first and second hearing aids comprises an input gain controller for controlling a relative weight between said electric sound input signal and said streamed audio input signal and providing a weighted sum of said input signals. Each of the first and second hearing aids further comprises an output transducer configured to convert the weighted sum of the input signals, or a further processed version thereof, to stimuli perceivable as sound by the user. The binaural hearing aid system further comprises a position detector configured to provide an estimate of a current position of the at least one target sound source relative to the user's head and to provide a position detector control signal indicative thereof. The binaural hearing aid system may further comprise that at least one (e.g. both) of said input gain controllers of the first and second hearing aids is configured to provide said relative weight in dependence of said position detector control signal.

Thereby an improved hearing aid system may be provided. In particular, binaural processing in the binaural hearing aid system provides input gains to the microphone signal(s) and the streamed signal(s) related to the position of current target sound source(s) relative to the user.

The first and second hearing aids may comprise first and second earpieces forming part of or constituting the first and second hearing aids, respectively. The earpieces may be adapted to be located in an ear of the user, e.g. at least partially in an ear canal of the user, e.g. partially outside the ear canal (e.g. partially in concha) and partially in the ear canal.

The wireless receiver may alternatively be located in a separate processing device forming part of the binaural hearing aid system and e.g. configured to service both earpieces.

The input transducer may comprise a noise reduction algorithm configured to reduce noise in the resulting electric sound input signal (i.e. provide the electric sound input signal with reduced noise). Likewise, the wireless receiver may comprise a noise reduction algorithm configured to reduce noise in the resulting streamed audio input signal.

The input transducer may e.g. comprise multitude of microphones and a beamformer filter configured to provide the resulting electric sound input signal as a beamformed signal.

The at least one target sound source providing the target signal received by the wireless receiver may be the same as the at least one target sound source providing the target signal received by the input transducer (e.g. if the audio transmitter is a microphone unit). They may, however, also be different (e.g. if the audio transmitter is a TV-sound transmitter).

An estimate of head movement activity, e.g. a detection of head movement, may e.g. indicate a change of the user's attention from one target sound source to another. The environment around the user may e.g. comprise more than one target sound source, e.g. two. The environment around the user may e.g. comprise one or more target sound sources that move relative to the user over time. The user's attention may over time may shift from one target sound source to another. An acoustic scene may comprise two or more target sound sources that are in a 'conversation-like' interaction, e.g. involving a shifting of 'the right to speak' (turn-taking), so that the speakers do not speak simultaneously (or only have a small overlap, e.g. less than 2 s, of simultaneous speech). In a first period of time, where the user's head movement activity is relatively small, e.g. below a threshold, it may be assumed that the user's attention is to a specific first target sound source (having a first position relative to the user, corresponding to a first look direction of the user). At times, where the user's head movement activity is relatively large, e.g. above a threshold, it may be assumed that the user's attention changes from one target sound source to another. When the user's head movement activity is (again) relatively small, it may be assumed that the user's attention is on the target sound source (e.g. located at a second position, corresponding to a second (current) look direction of the user).

The estimate of the position of the at least one target sound source relative to the user's head may comprise an estimate of an angle between the current look direction of the user, and a direction from the user's head to the at least one target sound source.

The estimate of the look direction and the direction from the user's head to a target sound source may be estimated relative to a common reference direction. The current look direction and the direction from the user's head to a (or the) target sound source may be estimated relative to a (e.g. common) reference direction. The (e.g. common) reference direction may be a 'normal forward-looking direction of a user'. In a typical scenario, the user looks at the target sound source of current interest to the user by orienting the head in the direction of the target sound source, e.g. either by turning the head alone or by including the torso, so that the current look direction is equal to the direction from the user to the target sound source. In other words, the angle between the direction to the target sound source of current interest to the user and the current look direction is equal to zero (or close to 0). Other target sound sources located elsewhere than the sound source of current interest (and e.g. assumed to (currently) be of minor interest to the user than the 'sound source of current interest') will exhibit an angle between the direction to said (other) target sound source in question and the current look direction of the user that is different from zero (e.g. more than a threshold angle different from zero, e.g. more than 10°).

'A normal forward-looking direction of a user' (cf. 'NLD' in FIG. 8B) may be defined as a direction the user looks when his or her head is in a normal forward-looking position relative to the torso (cf. 'TSO' in FIG. 8B) of the user, i.e. in a horizontal direction (see e.g. axis 'x' in FIG. 8A, 8B) perpendicular to a line though the shoulders (~torso (TSO)) of the user (see e.g. axis 'y' in FIG. 8A, 8B). Typically, predetermined head-related transfer functions are determined using a model of a human head and torso, where the look direction of the model is 'a normal forward-looking direction of a user' in the above sense. If the look direction of the user deviates from the normal forward-looking direction, the corresponding head-related transfer functions may be assumed to change, but it may be assumed that the change is relatively small and can be ignored in the present context.

The reference direction may be a direction from the user to the transmitter, or a normal forward-looking position relative to the torso (cf. e.g. 'TSO' in FIG. 8B) of the user.

The position of the transmitter relative to the user may be approximated by a direction from the user (e.g. a wireless receiver worn by the user) to the transmitter, or a normal forward-looking direction of the user.

Tracking (estimating) the position of the target audio sound source relative to the orientation of the user's head may be used to control the amplification of standard amplified sound of the hearing aids (picked up by the input transducer(s) of the hearing aid) while streaming, in other words to determine the relative weight between the electric sound input signal and the streamed audio input signal. When the user, for example, is looking at the TV (including a TV-audio sound transmitter), then the ambient sound amplification may be automatically reduced (relative to the streamed sound), and when the user looks away from the TV, then the ambient sound amplification may be automatically increased (relative to the streamed sound).

The input gain controller may be configured to decrease the relative weight of the electric sound input signal with increasing angle. A simple implementation of this may be to have full streaming gain, (e.g. gain=1 (0 dB)), when the users head is pointing in the direction of the desired source (angle ~0, within +/−30°), and to successively reduce the gain at larger deviations in angle (e.g. −3 dB at +/−45°, e.g. −6 dB at +/−60°, e.g. −12 dB at +/−90°, and up to −18 dB at more than +/−90° angles. Otherwise, a continuous dependence between gain and angle may be applied, e.g. with a maximum cap on attenuation (e.g. 6 dB).

The modification of the relative weights (gains) may be dependent on a reception control signal indicating that the at least one streamed audio input signal is currently being received, e.g. so that the weights are only modified, when a valid streamed audio input signal is retrieved.

The modification of the relative weights may further, or alternatively, be dependent on a voice control signal from a voice activity detector indicating the presence of a voice (e.g. the user's voice, or any voice, or other voices than the user's) in the electric sound input signal and/or in the streamed audio input signal. The input gain controller may be configured to only modify the weights when the streamed audio input signal comprises speech (e.g. is dominated by speech).

The modification of the relative weights may further or alternatively be dependent on a movement control signal from a movement detector indicating whether or not the user is moving. The input gain controller may be configured to only modify the weights when the user is NOT moving significantly (movement is below a threshold).

The position detector may comprise a head tracker configured to track an angle of rotation of the user's head compared to a reference direction to thereby estimate, or contribute to the estimation of, the position of the target sound source relative to the user's head. The angle of rotation of the user's head may e.g. be provided by a head tracker, e.g. based on 1D, 2D or 3D gyroscopes, and/or 1D, 2D or 3D accelerometers, and/or 1D, 2D or 3D magnetometers. Such devices are sometimes known under the common term 'Inertial Measurements Units' (IMUs), cf. e.g. EP3477964A1. The reference direction of the head tracker may e.g. be the 'normal forward-looking direction of a user'.

The head tracker may comprise a combination of a gyroscope and an accelerometer, e.g. a combination of 1D, 2D or 3D gyroscopes, and 1D, 2D or 3D accelerometers.

The position detector may comprise an eye tracker allowing to estimate a current eye gaze angle of the user relative to a current orientation of the user's head to thereby finetune the estimation of the position of the target sound source relative to the user's head. The current eye gaze angle of the user relative to a current orientation of the user's head may be represented by an angle relative to the current angle of rotation of the user's head. The eye gaze angle may thus be used as a modification (fine-tuning) of the position of the target sound source relative to the user's head, e.g. estimated as a sum of the angle of rotation of the user's head and the eye gaze angle (counted with sign, so that an eye gaze in the same direction as a head rotation has the same sign, whereas an eye gaze in the opposite direction as a head rotation has the opposite sign, $\theta_{pos}=\theta_{head}+\theta_{eye}$). The eye tracker may by based on one or more electrodes in contact with the user's skin to pick up potentials from the eyeballs. The electrodes may be located on a surface of a housing of the first and second hearing aids and be configured to provide appropriate Electrooculography (EOG) signal, cf. e.g. EP3185590A1.

The estimate of the position of the target sound source relative to the user's head may be determined as a combination of a) an angle (θ) between a line from the position of the target sound source to the head (e.g. its mid-point) of the user and a line parallel to a normal forward-looking direction of a user (both lines being located in a horizontal plane) and b) a distance (D) between the target sound source and the user's head. In other words, the position of the target sound source may be expressed in polar coordinates as (D, θ), when the coordinate system has its origo in the (middle of the) user's head (see e.g. FIG. 8B).

The estimate of the current position of the at least one target sound source relative to the user's head comprises an estimate of a distance between the target sound source and the user's head.

The estimate of the current position of the at least one target sound source relative to the user's head may comprise an estimate of a distance between the audio transmitter and the wireless receiver. A distance between transmitting and receiving devices (of the hearing aid system) may e.g. be estimated by detecting a received signal strength (e.g. a "Received Signal Strength Indicator" (RSSI) or a "Received Channel Power Indicator" (RCPI)) in the receiving device and receiving a transmitted signal strength (or channel power) from the transmitting device. The Bluetooth parameter 'High Accuracy Distance Measurement' (HADM) may likewise be used.

A direction from the transmitter to the user (e.g. to a wireless receiver, e.g. of the binaural hearing aid system, worn by the user) may e.g. be estimated in the wireless receiver(s) of the binaural hearing aid system.

The angle (cf. angle θU in FIG. 6) of the user's head may e.g. be measured (e.g. with a head tracker) and may be defined relative to the direction from the user (e.g. the user's head) to the transmitter (e.g. streaming unit (MA) in FIG. 6).

The input gain controller may be configured to decrease the relative weight of the electric sound input signal with increasing distance. The input gain controller may alternatively be configured to increase the relative weight of the streamed audio input signal with increasing distance.

The estimate of a position of the target sound source relative to the user's head may be provided as a user input. The binaural hearing aid system may comprise a user interface (e.g. implemented in an auxiliary device in communication with or forming part of the binaural hearing aid system, see e.g. FIG. 9). The user interface may be configured to allow the user to indicate the current position of the target sound source relative to the user's head, e.g. via a user operable activation element, e.g. one or more buttons, e.g. a touch sensitive screen and/or a key-board. The user interface may be configured to indicate an angle or a position of the sound source relative to a reference direction (or position), e.g. the user's head in a normal forward-looking direction (e.g. the direction of the nose). The user interface may be configured to allow the user to choose a current angle or position of the target sound source relative to the user based on a number of pre-defined positions (angles and/or distances), e.g. via a touch-screen interface depicting the user and a number of distinct selectable positions (angles and/or distances, cf. e.g. FIG. 9). The user interface may be implemented in a separate processing device forming part of the binaural hearing aid system and e.g. configured to service both earpieces.

Each of the first and second hearing aids may comprise a monaural audio signal processor configured to apply one or more processing algorithms to said weighted sum of said input signals and to provide a processed electric output signal in dependence thereof. The one or more processing algorithms may be configured to compensate for a hearing impairment of the user.

The position detector may be configured to estimate a direction of arrival of sound from the target sound source in dependence of one or more of the electric sound input signal and the streamed audio input signal. The direction of arrival of sound from the target sound source may be equal to the angle of the direction from the user's head to the target sound source relative to a reference direction, e.g. a normal forward-looking direction of a user, cf. e.g. FIG. 8A, 8B. A direction of arrival of sound from a target sound source may e.g. be estimated as disclosed in EP3285500A1. The position detector may comprise a look direction detector configured to provide a look direction control signal indicative of a current look direction of the user. The look direction detector may e.g. comprise one or more of a gyroscope, an accelerometer, and a magnetometer, and a detector of direction of arrival (DOA) of wireless signals.

The binaural hearing aid system may comprise a binaural audio signal processor configured to apply binaural gains to the streamed audio input signals of the first and second hearing aids. The binaural audio signal processor may be configured to provide respective first and second binaurally processed electric output signals comprising said streamed audio input signals of the first and second hearing aids after said binaural gains have been applied.

The binaural audio signal processor may be configured to control the binaural gains applied to the streamed audio input signal of the respective first and second hearing aids in dependence of the estimate of the position of the target sound source relative to the user's head. Thereby the first and second binaurally processed electric output signals providing a spatial sense of origin of the target sound source external to the user's head may be provided.

The binaural hearing aid system may comprise a separate processing device comprising the monaural and/or binaural audio signal processor and/or the wireless receiver(s). Each of the first and second hearing aids, e.g. the first and second earpieces, may comprise a wireless transceiver adapted for exchanging data, e.g. audio or other data, with the separate processing device.

The binaural hearing aid system may be configured to provide the respective first and second binaurally processed electric output signals in dependence of one or more detectors. The one or more detectors may comprise one or more of a wireless reception detector, a look direction detector (estimator), a distance detector (estimator), a voice activity detector (estimator), e.g. a general voice activity detector (e.g. a speech detector), and/or an own voice detector, a movement detector (providing a motion control signal indicative of a user's current motion), a brain wave detector, etc.

'Spatial information' (or 'spatial cues') providing a 'spatial sense of origin' to the user may comprise acoustic transfer functions from the target position (i.e. the position of the target sound source) to each of the first and second hearing aids (e.g. earpieces) when located at the first and second ears, respectively of the user (or relative acoustic transfer functions from one of the first and second earpieces (e.g. a microphone thereof) to the other, when sound impinges from the target position). The spatial information may e.g. be generated in the audio transmitter, based on head orientation data, measured in the hearing aid system and forwarded to the transmitter via a 'back link' from the hearing aid system to the audio transmitter. Hence, the streamed audio signal from the audio transmitter may include the spatial information. The streamed audio signal may e.g. be forwarded to the binaural hearing aid system as a stereo signal (e.g. different signals to first and second hearing aids). This could e.g. be relevant if the audio transmitter forms part of a remote microphone array, or a device comprising a microphone array (e.g. a table microphone, cf. e.g. FIG. 6 or FIG. 7H). The spatial information may alternatively be generated in the binaural hearing system, e.g. in a separate processing device or in each of the first and second hearing aids, or in combination between the audio transmitter and the binaural hearing aid system.

The spatial orientation data (e.g. head orientation data, or spatial cues) may be applied in the form of head-related (acoustic) transfer functions (HRTF) for acoustic propagation of sound from a sound source at a given position around the user to the different input transducers of the hearing aids of the hearing aid system (e.g. to one or more input transducers located at first and second ears of the user). The head-related transfer functions may be approximated by the level-difference between the two ears. The head-related transfer functions may be approximated by the latency-difference between the two ears. The head-related transfer functions may be represented by frequency dependent level- and latency-differences between the two ears. The head-related transfer functions may be implemented by application of specific (e.g. complex) binaural gain modifications to the signals presented by the first and second hearing aids (e.g. earpieces) at the left and right ears. The real and imaginary parts of the binaural complex gain modifications may represent the level differences (real part of gain) and latency differences (imaginary part of gain). In case of more than one audio signal is received by the binaural hearing aid system from respective more than one audio transmitters (or on the transmitter picking up differently located target sound sources, e.g. a table microphone), relevant HRTFs for each of the positions of the more than one audio transmitters (or target sound sources) may be applied to the corresponding more than one audio signal before being presented to the user. Thereby a spatial sense of origin external to said user's head of the one or more target sound sources corresponding to the sound provided by the audio transmitter(s) to the binaural hearing aid system may be provided. A resulting signal comprising appropriate acoustic transfer functions (HRTFs) (or impulse responses (HRIRs)) may be provided as a linear weighted combination of the signals from each target sound source, where the weights are the appropriate acoustic transfer functions (or impulse responses) for the respective sound source locations relative to the user. This may be accomplished by identifying the position of the currently present target sound sources over time as proposed by the present invention, and applying the appropriate HRTFs to various signals currently present in streamed audio input signal. To take into account also the assumed current interest of the user in the target sound sources present at a given point in time, the respective weights may also comprise an estimate of the respective priorities (e.g. determined according to the present disclosure) of these target sound sources.

The binaural hearing aid system may comprise a wireless reception detector configured to provide a reception control signal indicating whether or not the at least one streamed audio input signal comprising said target signal and optionally other signals from other sound sources in the environment around the user is currently received.

The target sound source may comprise sound from a television (TV) transmitted to the binaural hearing aid system via a TV-sound transmitter located together with the TV and/or a sound from one or more person(s) transmitted to the binaural hearing aid system via a microphone unit located at or near the person or persons in question. A scenario, where the user of the binaural hearing aid system is in conversation with two persons, each wearing a partner microphone unit, or sitting around a table microphone unit, configured to transmit sound from the person(s) in question to the binaural hearing aid system is illustrated in FIG. 4A, 4B and in FIG. 7G, 7H, respectively.

The input transducer may comprise a noise reduction algorithm configured to reduce noise in the resulting electric sound input signal and/or wherein the input transducer comprises a multitude of microphones and a beamformer filter configured to provide the resulting electric sound input signal as a beamformed signal in dependence of signals from said multitude of microphones. Likewise, the wireless receiver may comprise a noise reduction algorithm configured to reduce noise in the resulting streamed audio input signal.

The (e.g. each of the) first and second hearing aids are constituted by or comprises an air-conduction type hearing aid, a bone-conduction type hearing aid, a cochlear implant type hearing aid, or a combination thereof.

In a further aspect of the present application, a binaural hearing aid system is provided. The binaural hearing aid system comprises

- first and second earpieces adapted for being located at or in left and right ears, respectively, of a user, each of the first and second earpieces comprising
  - an input transducer for converting respective first and second acoustically propagated signals impinging on said first and second earpieces to first and second electric sound input signals, respectively, each of the received acoustically propagated signals comprising a target signal from a target sound source and other signals from other sound sources in an environment around the user; and
  - an output transducer configured to receive and convert respective first and second binaurally processed electric output signals of said respective earpieces to stimuli perceivable as sound by the user;
- at least one wireless receiver for receiving a wirelessly transmitted signal from an audio transmitter and for retrieving therefrom at least one streamed audio input signal comprising said target signal and optionally other signals from other sound sources in the environment around the user;
- a position detector configured to provide an estimate of a current position of the target sound source relative to the user's head and to provide a position detector control signal indicative thereof; and
- a binaural audio signal processor configured to receive said at least one streamed audio signal, said first and second electric sound input signals and said at least one detector signal, and to provide said respective first and second binaurally processed electric output signals in dependence thereof; and wherein the hearing system, in a specific audio streaming reception mode, is configured to provide said first and second binaurally processed electric output signals in dependence of said at least one streamed audio input signal said position detector control signal.

Thereby an improved hearing aid system may be provided. In particular binaural processing in the binaural hearing aid system provides spatial cues related to the current target sound source(s) of interest to the user.

The position detector may be configured to track the position of the user's head relative to the audio transmitter over time. The position detector may be configured to track the position of the user's head relative to the audio transmitter at least from one time instant to the next, preferably over a certain time range, e.g. of the order of seconds. The tracking (or the detector control signal) may be smoothed over time, e.g. to avoid or minimize reaction to small (short) movement changes.

The position detector may be configured to provide that the position detector control signal is indicative of at least one of a) a current distance between the target sound source and the user's head and b) a current angle between a direction from the user's head to the target sound source and a current look direction of the user.

A modifying level or gain applied to the first and second binaurally processed electric output signals may be determined in dependence of a current distance between the target sound source and the user's head, so that the modifying level or gain increases with decreasing distance and decreases with increasing distance, at least within a certain level or gain modification range.

A modifying level or gain applied to the first and second binaurally processed electric output signals may be determined in dependence of said current angle between a direction from the user's head to the target sound source and a current look direction of the user, so that said modifying level or gain increases with decreasing absolute value of said angle and decreases with increasing absolute value of said angle, at least within a certain level or gain modification range.

The modifying level or gain applied to the first and second binaurally processed electric output signals may be determined in dependence of the current position of the user's head relative to the audio transmitter, e.g. the current angle between a direction from the user's head to the target sound source and a current look direction of the user and the current distance between the target sound source and the user's head.

In a further aspect of the present application, a binaural hearing aid system is provided. The binaural hearing aid system comprises

- first and second hearing aids comprising respective first and second earpieces adapted for being located at or in left and right ears, respectively, of a user, each of the first and second earpieces comprising
  - an input transducer for converting respective first and second acoustically propagated signals impinging on said first and second earpieces to first and second electric sound input signals, respectively, each of the received acoustically propagated signals comprising a target signal from a target sound source and other signals from other sound sources in an environment around the user; and
  - an output transducer configured to receive and convert respective first and second binaurally processed electric output signals of said respective earpieces to stimuli perceivable as sound by the user;
- at least one wireless receiver for receiving a wirelessly transmitted signal from an audio transmitter and for retrieving therefrom at least one streamed audio input signal comprising said target signal and optionally other signals from other sound sources in the environment around the user; and
- a binaural audio signal processor configured to receive said at least one streamed audio signal and said first and second electric sound input signals and to provide said respective first and second binaurally processed electric output signals in dependence thereof.

The binaural audio signal processor is further configured to apply binaural spatial processing to said at least one streamed audio input signal and to provide said respective first and second binaurally processed electric output signals providing a spatial sense of origin external to said user's head of said target sound source in dependence of one or more of

- said at least one streamed audio input signal and said first and second electric sound input signals,
- said at least one streamed audio input signal, and
- an estimate of a) head movement activity or of b) a position of the target sound source and/or of said audio transmitter relative to the user's head.

The first and second hearing aids may comprise first and second earpieces forming part of or constituting said first and second hearing aids, respectively. The earpieces may be adapted to be located in an ear of the user, e.g. at least partially in an ear canal of the user, e.g. partially outside the ear canal (e.g. partially in concha) and partially in the ear canal.

The at least one wireless receiver may be located in a separate processing device forming part of the binaural hearing aid system and configured to service both earpieces. Each of the first and second hearing aids may comprise a wireless receiver (together forming part of, such as constituting 'the at least one wireless receiver').

The 'spatial information' (or 'spatial cues') providing the 'spatial sense of origin' to the user may comprise acoustic transfer functions from the target position (i.e. the position of the target sound source) to each of the first and second earpieces when located at the first and second ears, respectively of the user (or relative acoustic transfer functions from one of the first and second earpieces (e.g. microphones thereof) to the other, when sound impinges from the target position). The spatial information may e.g. be generated in the transmitter, based on head orientation data, measured in the hearing aid system and forwarded to the transmitter via a 'back link' from the hearing aid system to the transmitter. Hence, the streamed audio signal from the transmitter may include the spatial information. The streamed audio signal may e.g. be forwarded to the binaural hearing aid system as a stereo signal. This could e.g. be relevant if the transmitter forms part of a remote microphone array, or a device comprising a microphone array (e.g. a table microphone). The spatial information may be generated in the binaural hearing system, e.g. in a separate processing device or in each of the first and second hearing aids, or in combination between the transmitter and the binaural hearing aid system.

An estimate of head movement activity, e.g. a detection of head movement, may e.g. indicate a change of the user's attention from one target sound source to another. The environment around the user may e.g. comprise more than one target sound source, e.g. two. The environment around the user may e.g. comprise one or more target sound sources that move relative to the user over time. The user's attention may over time shift from one target sound source to another. An acoustic scene may comprise two or more target sound sources that are in a 'conversation-like' interaction, e.g. involving a shifting of 'the right to speak' (turn-taking), so that the speakers do not speak simultaneously (or only have a small overlap of simultaneous speech). In a first period of time, where the user's head movement activity is relatively small, it may be assumed that the user's attention is to a specific first target sound source (having a first position relative to the user, corresponding to a first look direction of the user). At times, where the user's head movement activity is relatively large, a change of the user's attention from one target sound source to another. When the user's head movement activity is (again) relatively small, it may be assumed that the user's attention is on the target sound source (e.g. located at a second position, corresponding to a second (current) look direction of the user).

The binaural hearing aid system may comprise a monaural audio signal processor configured to apply one or more processing algorithms to said first and second electric sound input signals, respectively, and optionally to said streamed audio input signal, or to a signal or signals originating therefrom. The monaural audio signal processor may comprise first and second monaural audio signal processors. The first and second monaural audio signal processor may form part of the binaural audio signal processor. The first and second monaural audio signal processor may be located in the first and second hearing aids, e.g. in the first and second earpieces, respectively, or in a separate processing device. The first monaural audio signal processor may be configured to apply one or more processing algorithms to the first electric sound input signal and, optionally, to the streamed audio input signal(s), or to a signal or signals originating therefrom, e.g. to compensate for a hearing impairment of the user. Likewise, the second monaural audio signal processor may be configured to apply one or more processing algorithms to the second electric sound input signal and, optionally, to the streamed audio input signal(s), or to a signal or signals originating therefrom. The binaural audio signal processor may be configured to provide binaural gains adapted to modify monaural gains provided by said first and second monaural processors for said first and second electric sound input signals and, optionally, said streamed audio input signal(s), or to a signal or signals originating therefrom. The binaural gains may e.g. be constituted by or comprise gains that provide said spatial sense of origin of said target sound source in said first and second binaurally processed electric output signals.

The binaural audio signal processor may be configured to estimate a direction of arrival of sound from the target sound source in dependence of the streamed audio input signal and the first and second electric sound input signals. A direction of arrival of sound from a target sound source may e.g. be estimated as disclosed in EP3285500A1.

The binaural audio signal processor may be configured to control the gain applied to the at least one streamed audio signal in dependence of the estimate of the position of the target sound source relative to the user's head. Thereby the first and second binaurally processed electric output signals providing a spatial sense of origin of the target sound source external to the user's head may be provided. E.g. when the user is looking in the direction of the source of the streamed sound, the streamed sound amplification is increased relative to the acoustically propagated sound; and vice versa, when the user is looking away from the source of the streamed sound, the streamed sound amplification is decreased relative to the acoustically propagated sound.

The binaural hearing aid system may comprise a separate processing device comprising the binaural audio signal processor and/or the at least one wireless receiver.

Each of the first and second hearing aids, e.g. the first and second earpieces, of the binaural hearing aid system may comprise a wireless transceiver adapted for exchanging data, e.g. audio or other data, with the separate processing device.

The binaural hearing aid system may be configured to provide the respective first and second binaurally processed electric output signals in (further) dependence of one or more detectors. The one or more detectors may comprise one or more of a wireless reception detector, a level detector, a look direction detector (estimator), a distance detector (estimator), a voice activity detector (estimator), e.g. a general voice activity detector (e.g. a speech detector), and/or an own voice detector, a movement detector, a brain wave detector, etc.

The binaural hearing aid system may comprise a wireless reception detector configured to provide a reception control signal indicating whether or not the at least one streamed audio input signal comprising said target signal and optionally other signals from other sound sources in the environment around the user is currently received.

The binaural hearing aid system may comprise a look direction detector configured to provide a look direction control signal indicative of a current look direction of the user relative to a direction to the position of the target sound source. The look direction detector may e.g. comprise one or more of a gyroscope, an accelerometer, and a magnetometer, and a detector of direction of arrival (DOA) of wireless signals.

The binaural hearing aid system may comprise a motion sensor providing a motion control signal indicative of a user's current motion.

The levels of the first and second binaurally processed electric output signals may be modified in dependence of a difference between a current look direction and a direction to the position of the target sound source. The levels may be modified by applying a (real) gain to the magnitude of the signal in question. The modification may b frequency dependent. The levels of the first and second binaurally processed electric output signals may be modified in dependence of the look direction control signal indicative of a current look direction of the user relative to a direction to the position of the target sound source. The modification of the levels may be dependent on the reception control signal indicating that the at least one streamed audio input signal is currently being received. The levels may be increased the smaller the difference between the current look direction and the direction to the position of the target sound source and decreased the larger the difference between the current look direction and the direction to the position of the target sound source. The levels may e.g. be modified within a range, e.g. between a maximum and a minimum level modification, e.g. limited to 6 dB.

The levels of the first and second binaurally processed electric output signals may be modified in dependence of a current distance between the target sound source and the user's head. The levels may be increased or decreased, the smaller or larger, respectively, the distance between the target sound source and said user's head. The levels of the first and second binaurally processed electric output signals may be modified in dependence of the distance control signal indicative of a current distance between the target sound source and the user's head. The modification of the levels may further be dependent on the reception control signal indicating that the at least one streamed audio input signal is currently being received. The modification of the levels may further be dependent on the look direction control signal being indicative of the current look direction being equal to or within a certain range (e.g. angle Δθ, e.g. +/−5°) of the direction to the position of the target sound source.

The modification of the levels may further or alternatively be dependent on a voice control signal from a voice activity detector indicating the presence of a voice (e.g. the user's voice, or any voice) in the first and second electric sound input signals.

The modification of the levels may further or alternatively be dependent on a movement control signal from a movement detector indicating whether or not the user is moving.

The target sound source may comprise sound from a television (TV) transmitted to the binaural hearing aid system via a TV-sound transmitter located together with the TV and/or a sound from one or more person(s) transmitted to the binaural hearing aid system via a microphone unit located at the person or persons in question on a table or a carrier located near said person or persons. A scenario, where the user of the binaural hearing aid system is in conversation with two persons, each wearing a partner microphone unit configured to transmit sound from the person in question to the binaural hearing aid system is illustrated in FIG. 4A, 4B. A scenario, where a microphone unit picks up sound from two sound sources and transmits a resulting sound signal to a binaural hearing aid system is illustrated in FIG. 7G, 7H.

The binaural hearing aid system may be configured to track the position of the user relative to the audio transmitter providing said target signal and providing said spatial sense of origin of said target sound source external to said user's head by applying head-related transfer functions to the first and second binaurally processed electric output signals. The head-related transfer functions (HRTF) may be approximated by the level difference between the two ears. The head-related transfer functions may be approximated by the latency difference between the two ears. The head-related transfer functions may be represented by frequency dependent level and latency differences between the two ears. In case of more than one audio signal is received by the binaural hearing aid system from respective more than one audio transmitters, relevant HRTFs for each of the positions of the more than one audio transmitters may be applied to the corresponding more than one audio signal before being presented to the user. Thereby a spatial sense of origin external to said user's head of the one or more target sound sources corresponding to the sound provided by the more than one audio transmitters to the binaural hearing aid system.

The first and second hearing aids may be constituted by or comprise an air-conduction type hearing aid, a bone-conduction type hearing aid, a cochlear implant type hearing aid, or a combination thereof.

A Hearing Aid System:

In a further aspect, hearing aid system comprising a hearing aid and an audio transmitter is provided. The hearing aid and the audio transmitter are being configured to exchange data between them (e. comprising appropriate antenna and transmitter-receiver circuitry).

The hearing aid comprises
- a wireless receiver for receiving a wirelessly transmitted signal from the audio transmitter and for retrieving therefrom a streamed audio input signal comprising at least one target signal and optionally other signals from other sound sources in the environment around the target sound source;
- a position detector configured to provide an estimate of a current position of the at least one target sound source relative to the user's head and to provide a position detector control signal indicative thereof;
- wherein the hearing aid is configured to transmit the position detector control signal to the audio transmitter;
- a wireless transmitter for transmitting data to the audio transmitter;

the audio transmitter comprising
- an input unit configured to provide at least one (transmitter) electric input signal representing sound;
- a wireless audio transmitter configured to transmit data, e.g. audio data, including the at least one (transmitter) electric input signal representing sound, to the hearing aid; and
- a wireless receiver configured to receive data, including the position detector control signal, from the hearing aid; and
- a transmit processor configured to determine and to apply a transmitter gain to the at least one (transmitter) electric input signal in dependence of the position detector control signal.

The hearing aid may further comprise an input transducer for converting an acoustically propagated signal impinging on the input transducer to an electric sound input signal comprising a target signal from at least one target sound source and other signals from possible other sound sources in an environment around the user.

The audio transmitter may e.g. comprise a television-(TV) or other video-sound transmitter configured to receive and transmit sound from a TV or other video device to the hearing aid. The audio transmitter may e.g. comprise a microphone unit configured to pick up and transmit sound from oner or more target sound sources in the environment of the microphone unit. The TV- (or video-) sound transmitter may e.g. be located together with (or integrated in) the TV (or video device). The target sound source may comprise the sound from the TV or video device transmitted to the hearing aid via the TV- or video sound transmitter. The microphone unit may be configured to be located at or near a person or a group of persons (e.g. constituting target sound source(s)). The target sound source may comprise sound from one or more person(s) transmitted to the hearing aid via the microphone unit, when located at or near the person or persons in question.

The estimate of the position of the at least one target sound source relative to the user's head may comprise an estimate of an angle between a reference direction, and a direction from the user's head to the at least one target sound source. Thereby a priority between two (or more) sound sources may be implemented in the audio transmitter (e.g. constituting or forming part of a microphone unit, e.g. a table microphone unit (e.g. a 'speakerphone)'). The reference direction may e.g. be a normal forward-looking direction of a user, cf. e.g. FIG. 8A, 8B, or a direction to an audio transmitter, cf. e.g. FIG. 6. In a typical scenario, the user looks at the target sound source of current interest to the user by orienting the head in the direction of the target sound source, e.g. either by turning the head alone or by including the torso, so that the current look direction is equal to the direction from the user to the target sound source. In other words, the angle between the direction to the target sound source and the current look direction is zero (or close to 0).

The transmitter gain may comprise spatial information representing the current position of the at least one target sound source relative to the user's head. In other words, spatial information is generated in the audio transmitter, based on head orientation data, measured in the hearing aid and forwarded to the transmitter via a 'back link' from the hearing aid to the audio transmitter. Hence, the streamed audio signal from the audio transmitter may include the spatial information. The streamed audio signal may e.g. be forwarded to a binaural hearing aid system comprising left and right hearing aids as a stereo signal. This could e.g. be relevant if the audio transmitter forms part of a remote microphone unit comprising a microphone array (e.g. a table microphone), e.g. involving more than one, e.g. intermittently talking, target sound sources (e.g. persons) at different locations around the microphone unit.

A prioritization between the electric sound input signal picked up by the respective input transducers of the first and second hearing aids and the streamed audio input signal in dependence of the position detector control signal may be provided by respective input gain controllers of the first and second hearing aids, e.g. as respective weighted sums ($out_1$, $out_2$) of the input signals and, respectively. The hearing aid may comprise an input gain controller for controlling a relative weight between the electric sound input signal and the streamed audio input signal and providing a weighted sum of the input signals.

Features of a Hearing Aid for Use in the Binaural Hearing Aid System or the Hearing Aid System:

The hearing aid may be adapted to provide a frequency dependent gain and/or a level dependent compression and/or a transposition (with or without frequency compression) of one or more frequency ranges to one or more other frequency ranges, e.g. to compensate for a hearing impairment of a user. The hearing aid may comprise a signal processor for enhancing the input signals and providing a processed output signal.

The hearing aid may comprise an output unit for providing a stimulus perceived by the user as an acoustic signal based on a processed electric signal. The output unit may comprise a number of electrodes of a cochlear implant (for a CI type hearing aid) or a vibrator of a bone conducting hearing aid. The output unit may comprise an output transducer. The output transducer may comprise a receiver (loudspeaker) for providing the stimulus as an acoustic signal to the user (e.g. in an acoustic (air conduction based) hearing aid). The output transducer may comprise a vibrator for providing the stimulus as mechanical vibration of a skull bone to the user (e.g. in a bone-attached or bone-anchored hearing aid). The output unit may (additionally or alternatively) comprise a transmitter for transmitting sound picked up-by the hearing aid to another device, e.g. a far-end communication partner (e.g. via a network, e.g. in a telephone mode of operation, or in a headset configuration).

The hearing aid may comprise an input unit for providing an electric input signal representing sound. The input unit may comprise an input transducer, e.g. a microphone, for converting an input sound to an electric input signal. The input unit may comprise a wireless receiver for receiving a wireless signal comprising or representing sound and for providing an electric input signal representing said sound.

The wireless receiver and/or transmitter may e.g. be configured to receive and/or transmit an electromagnetic signal in the radio frequency range (3 kHz to 300 GHz). The wireless receiver and/or transmitter may e.g. be configured to receive and/or transmit an electromagnetic signal in a frequency range of light (e.g. infrared light 300 GHz to 430 THz, or visible light, e.g. 430 Hz to 770 THz).

The hearing aid may comprise a directional microphone system adapted to spatially filter sounds from the environment, and thereby enhance a target acoustic source among a multitude of acoustic sources in the local environment of the user wearing the hearing aid. The directional system may be adapted to detect (such as adaptively detect) from which direction a particular part of the microphone signal originates. This can be achieved in various different ways as e.g. described in the prior art. In hearing aids, a microphone array beamformer is often used for spatially attenuating background noise sources. The beamformer may comprise a linear constraint minimum variance (LCMV) beamformer. Many beamformer variants can be found in literature. The minimum variance distortionless response (MVDR) beamformer is widely used in microphone array signal processing. Ideally the MVDR beamformer keeps the signals from the target direction (also referred to as the look direction) unchanged, while attenuating sound signals from other directions maximally. The generalized sidelobe canceller (GSC) structure is an equivalent representation of the MVDR beamformer offering computational and numerical advantages over a direct implementation in its original form.

The hearing aid may comprise antenna and transceiver circuitry allowing a wireless link to an entertainment device (e.g. a TV-set), a communication device (e.g. a telephone), a wireless microphone, or another hearing aid, etc. The hearing aid may thus be configured to wirelessly receive a direct electric input signal from another device. Likewise, the hearing aid may be configured to wirelessly transmit a direct electric output signal to another device. The direct electric input or output signal may represent or comprise an audio signal and/or a control signal and/or an information signal.

In general, a wireless link established by antenna and transceiver circuitry of the hearing aid can be of any type. The wireless link may be a link based on near-field communication, e.g. an inductive link based on an inductive coupling between antenna coils of transmitter and receiver parts. The wireless link may be based on far-field, electromagnetic radiation. Preferably, frequencies used to establish a communication link between the hearing aid and the other device is below 70 GHz, e.g. located in a range from 50 MHz to 70 GHz, e.g. above 300 MHz, e.g. in an ISM range above 300 MHz, e.g. in the 900 MHz range or in the 2.4 GHz range or in the 5.8 GHz range or in the 60 GHz range (ISM=Industrial, Scientific and Medical, such standardized ranges being e.g. defined by the International Telecommunication Union, ITU). The wireless link may be based on a standardized or proprietary technology. The wireless link may be based on Bluetooth technology (e.g. Bluetooth Low-Energy technology, e.g. LE Audio), or Ultra WideBand (UWB) technology.

The hearing aid may be or form part of a portable (i.e. configured to be wearable) device, e.g. a device comprising a local energy source, e.g. a battery, e.g. a rechargeable battery. The hearing aid may e.g. be a low weight, easily wearable, device, e.g. having a total weight less than 100 g, such as less than 20 g.

The hearing aid may comprise a 'forward' (or 'signal') path for processing an audio signal between an input and an output of the hearing aid. A signal processor may be located in the forward path. The signal processor may be adapted to provide a frequency dependent gain according to a user's particular needs (e.g. hearing impairment). The hearing aid may comprise an 'analysis' path comprising functional components for analyzing signals and/or controlling processing of the forward path. Some or all signal processing of the analysis path and/or the forward path may be conducted in the frequency domain, in which case the hearing aid comprises appropriate analysis and synthesis filter banks. Some or all signal processing of the analysis path and/or the forward path may be conducted in the time domain.

An analogue electric signal representing an acoustic signal may be converted to a digital audio signal in an analogue-to-digital (AD) conversion process, where the analogue signal is sampled with a predefined sampling frequency or rate $f_s$, $f_s$ being e.g. in the range from 8 kHz to 48 kHz (adapted to the particular needs of the application) to provide digital samples $x_n$ (or x[n]) at discrete points in time $t_n$ (or n), each audio sample representing the value of the acoustic signal at $t_n$ by a predefined number $N_b$ of bits, $N_b$ being e.g. in the range from 1 to 48 bits, e.g. 24 bits. Each audio sample is hence quantized using $N_b$ bits (resulting in $2^{Nb}$ different possible values of the audio sample). A digital sample x has a length in time of $1/f_s$, e.g. 50 μs, for $f_s$=20 kHz. A number of audio samples may be arranged in a time frame. A time frame may comprise 64 or 128 audio data samples. Other frame lengths may be used depending on the practical application.

The hearing aid may comprise an analogue-to-digital (AD) converter to digitize an analogue input (e.g. from an input transducer, such as a microphone) with a predefined sampling rate, e.g. 20 kHz. The hearing aids may comprise a digital-to-analogue (DA) converter to convert a digital signal to an analogue output signal, e.g. for being presented to a user via an output transducer.

The hearing aid, e.g. the input unit, and or the antenna and transceiver circuitry may comprise a transform unit for converting a time domain signal to a signal in the transform domain (e.g. frequency domain or Laplace domain, Z transform, wavelet transform, etc.). The transform unit may be constituted by or comprise a TF-conversion unit for providing a time-frequency representation of an input signal. The time-frequency representation may comprise an array or map of corresponding complex or real values of the signal in question in a particular time and frequency range. The TF conversion unit may comprise a filter bank for filtering a (time varying) input signal and providing a number of (time varying) output signals each comprising a distinct frequency range of the input signal. The TF conversion unit may comprise a Fourier transformation unit (e.g. a Discrete Fourier Transform (DFT) algorithm, or a Short Time Fourier Transform (STFT) algorithm, or similar) for converting a time variant input signal to a (time variant) signal in the (time-)frequency domain. The frequency range considered by the hearing aid from a minimum frequency $f_{min}$ to a maximum frequency $f_{max}$ may comprise a part of the typical human audible frequency range from 20 Hz to 20 kHz, e.g. a part of the range from 20 Hz to 12 kHz. Typically, a sample rate $f_s$ is larger than or equal to twice the maximum frequency $f_{max}$, $f_s \geq 2f_{max}$. A signal of the forward and/or analysis path of the hearing aid may be split into a number NI of frequency bands (e.g. of uniform width), where NI is e.g. larger than 5, such as larger than 10, such as larger than 50, such as larger than 100, such as larger than 500, at least some of which are processed individually. The hearing aid may be adapted to process a signal of the forward and/or analysis path in a number NP of different frequency channels (NP≤NI). The frequency channels may be uniform or non-uniform in width (e.g. increasing in width with frequency), overlapping or non-overlapping.

The hearing aid may be configured to operate in different modes, e.g. a normal mode and one or more specific modes, e.g. selectable by a user, or automatically selectable. A mode of operation may be optimized to a specific acoustic situation or environment, e.g. a communication mode, such as a telephone mode. A mode of operation may include a low-power mode, where functionality of the hearing aid is reduced (e.g. to save power), e.g. to disable wireless communication, and/or to disable specific features of the hearing aid.

The hearing aid may comprise a number of detectors configured to provide status signals relating to a current physical environment of the hearing aid (e.g. the current acoustic environment), and/or to a current state of the user wearing the hearing aid, and/or to a current state or mode of operation of the hearing aid. Alternatively or additionally, one or more detectors may form part of an external device in communication (e.g. wirelessly) with the hearing aid. An external device may e.g. comprise another hearing aid, a remote control, and audio delivery device, a telephone (e.g. a smartphone), an external sensor, etc.

One or more of the number of detectors may operate on the full band signal (time domain). One or more of the number of detectors may operate on band split signals ((time-) frequency domain), e.g. in a limited number of frequency bands.

The number of detectors may comprise a level detector for estimating a current level of a signal of the forward path. The detector may be configured to decide whether the current level of a signal of the forward path is above or below a given (L-) threshold value. The level detector operates on the full band signal (time domain). The level detector operates on band split signals ((time-) frequency domain).

The hearing aid may comprise a voice activity detector (VAD) for estimating whether or not (or with what probability) an input signal comprises a voice signal (at a given point in time). A voice signal may in the present context be taken to include a speech signal from a human being. It may also include other forms of utterances generated by the human speech system (e.g. singing). The voice activity detector unit may be adapted to classify a current acoustic environment of the user as a VOICE or NO-VOICE environment. This has the advantage that time segments of the electric microphone signal comprising human utterances (e.g. speech) in the user's environment can be identified, and thus separated from time segments only (or mainly) comprising other sound sources (e.g. artificially generated noise). The voice activity detector may be adapted to detect as a VOICE also the user's own voice. Alternatively, the voice activity detector may be adapted to exclude a user's own voice from the detection of a VOICE.

The hearing aid may comprise an own voice detector for estimating whether or not (or with what probability) a given input sound (e.g. a voice, e.g. speech) originates from the voice of the user of the system. A microphone system of the hearing aid may be adapted to be able to differentiate between a user's own voice and another person's voice and possibly from NON-voice sounds.

The number of detectors may comprise a movement detector, e.g. an acceleration sensor. The movement detector may be configured to detect movement of the user's facial muscles and/or bones, e.g. due to speech or chewing (e.g. jaw movement) and to provide a detector signal indicative thereof.

The hearing aid may comprise a classification unit configured to classify the current situation based on input signals from (at least some of) the detectors, and possibly other inputs as well. In the present context 'a current situation' may be taken to be defined by one or more of a) the physical environment (e.g. including the current electromagnetic environment, e.g. the occurrence of electromagnetic signals (e.g. comprising audio and/or control signals) intended or not intended for reception by the hearing aid, or other properties of the current environment than acoustic);

b) the current acoustic situation (input level, feedback, etc.), and c) the current mode or state of the user (movement, temperature, cognitive load, etc.);

d) the current mode or state of the hearing aid (program selected, time elapsed since last user interaction, etc.) and/or of another device in communication with the hearing aid.

The classification unit may be based on or comprise a neural network, e.g. a trained neural network.

The hearing aid may comprise an acoustic (and/or mechanical) feedback control (e.g. suppression) or echo-cancelling system. Adaptive feedback cancellation has the ability to track feedback path changes over time. It is typically based on a linear time invariant filter to estimate the feedback path but its filter weights are updated over time. The filter update may be calculated using stochastic gradient algorithms, including some form of the Least Mean Square (LMS) or the Normalized LMS (NLMS) algorithms. They both have the property to minimize the error signal in the mean square sense with the NLMS additionally normalizing the filter update with respect to the squared Euclidean norm of some reference signal.

The hearing aid may further comprise other relevant functionality for the application in question, e.g. compression, noise reduction, etc.

The hearing aid may comprise a hearing instrument, e.g. a hearing instrument adapted for being located at the ear or fully or partially in the ear canal of a user, e.g. a headset, an earphone, an ear protection device or a combination thereof. A hearing system may comprise a speakerphone (comprising a number of input transducers and a number of output transducers, e.g. for use in an audio conference situation), e.g. comprising a beamformer filtering unit, e.g. providing multiple beamforming capabilities.

A Hearing System

In a further aspect, a hearing system comprising a hearing aid system as described above, in the 'detailed description of embodiments', and in the claims, AND an auxiliary device is moreover provided.

The hearing system may be adapted to establish a communication link between the hearing aid and the auxiliary device to provide that information (e.g. control and status signals, possibly audio signals) can be exchanged or forwarded from one to the other.

The auxiliary device may comprise a remote control, a smartphone, or other portable or wearable electronic device, such as a smartwatch or the like.

The auxiliary device may be constituted by or comprise a remote control for controlling functionality and operation of the hearing aid(s). The function of a remote control may be implemented in a smartphone, the smartphone possibly running an APP allowing to control the functionality of the audio processing device via the smartphone (the hearing aid(s) comprising an appropriate wireless interface to the smartphone, e.g. based on Bluetooth or some other standardized or proprietary scheme).

The auxiliary device may be constituted by or comprise an audio gateway device adapted for receiving a multitude of audio signals (e.g. from an entertainment device, e.g. a TV or a music player, a telephone apparatus, e.g. a mobile telephone or a computer, e.g. a PC) and adapted for selecting and/or combining an appropriate one of the received audio signals (or combination of signals) for transmission to the hearing aid.

The auxiliary device may be constituted by or comprise another hearing aid. The hearing system may comprise two hearing aids adapted to implement a binaural hearing system, e.g. a binaural hearing aid system.

An APP:

In a further aspect, a non-transitory application, termed an APP, is furthermore provided by the present disclosure. The APP comprises executable instructions configured to be executed on an auxiliary device to implement a user interface for a hearing aid or a hearing system described above in the 'detailed description of embodiments', and in the claims. The APP may be configured to run on cellular phone, e.g. a smartphone, or on another portable device allowing communication with said hearing aid or said hearing system.

Definitions

In the present context, a hearing aid, e.g. a denoted a hearing instrument, refers to a device, which is adapted to improve, augment and/or protect the hearing capability of a user by receiving acoustic signals from the user's surroundings, generating corresponding audio signals, possibly modifying the audio signals and providing the possibly modified audio signals as audible signals to at least one of the user's ears. Such audible signals may e.g. be provided in the form of acoustic signals radiated into the user's outer ears, acoustic signals transferred as mechanical vibrations to the user's inner ears through the bone structure of the user's head and/or through parts of the middle ear as well as electric signals transferred directly or indirectly to the cochlear nerve of the user.

The hearing aid may be configured to be worn in any known way, e.g. as a unit arranged behind the ear with a tube leading radiated acoustic signals into the ear canal or with an output transducer, e.g. a loudspeaker, arranged close to or in the ear canal, as a unit entirely or partly arranged in the pinna and/or in the ear canal, as a unit, e.g. a vibrator, attached to a fixture implanted into the skull bone, as an attachable, or entirely or partly implanted, unit, etc. The hearing aid may comprise a single unit or several units communicating (e.g. acoustically, electrically or optically) with each other. The loudspeaker may be arranged in a housing together with other components of the hearing aid, or may be an external unit in itself (possibly in combination with a flexible guiding element, e.g. a dome-like element).

A hearing aid may be adapted to a particular user's needs, e.g. a hearing impairment. A configurable signal processing circuit of the hearing aid may be adapted to apply a frequency and level dependent compressive amplification of an input signal. A customized frequency and level dependent gain (amplification or compression) may be determined in a fitting process by a fitting system based on a user's hearing data, e.g. an audiogram, using a fitting rationale (e.g. adapted to speech). The frequency and level dependent gain may e.g. be embodied in processing parameters, e.g. uploaded to the hearing aid via an interface to a programming device (fitting system), and used by a processing algorithm executed by the configurable signal processing circuit of the hearing aid.

A 'hearing system' refers to a system comprising one or two hearing aids, and a 'binaural hearing system' refers to a system comprising two hearing aids and being adapted to cooperatively provide audible signals to both of the user's ears. Hearing systems or binaural hearing systems may further comprise one or more 'auxiliary devices', which communicate with the hearing aid(s) and affect and/or benefit from the function of the hearing aid(s). Such auxiliary devices may include at least one of a remote control, a remote microphone, an audio gateway device, an entertainment device, e.g. a music player, a wireless communication device, e.g. a mobile phone (such as a smartphone) or a tablet or another device, e.g. comprising a graphical interface. Hearing aids, hearing systems or binaural hearing systems may e.g. be used for compensating for a hearing-impaired person's loss of hearing capability, augmenting or protecting a normal-hearing person's hearing capability and/or conveying electronic audio signals to a person. Hearing aids or hearing systems may e.g. form part of or interact with public-address systems, active ear protection systems, handsfree telephone systems, car audio systems, entertainment (e.g. TV, music playing or karaoke) systems, teleconferencing systems, classroom amplification systems, etc.

Embodiments of the disclosure may e.g. be useful in applications such as applications.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

The figures are schematic and simplified for clarity, and they just show details which are essential to the understanding of the disclosure, while other details are left out. Throughout, the same reference signs are used for identical or corresponding parts.

Figure 1A:
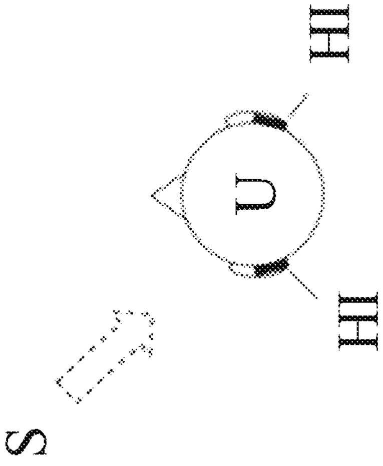
FIG. 1A shows how streamed sound S can be presented to the user wearing a binaural hearing aid system (comprising left right hearing instruments, HI), as arriving from a certain direction, like 45° to the left of the user's look direction.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include micro-electronic-mechanical systems (MEMS), integrated circuits (e.g. application specific), microprocessors, microcontrollers, digital signal processors (DSPs), field programmable gate arrays (FPGAs), programmable logic devices (PLDs), gated logic, discrete hardware circuits, printed circuit boards (PCB) (e.g. flexible PCBs), and other suitable hardware configured to perform the various functionality described throughout this disclosure, e.g. sensors, e.g. for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The present application relates to the field of hearing aids, in particular to hearing aids or hearing aid systems configured to received one or more streamed audio signals.

In the present disclosure, it is proposed to (perceptually) place the streamed audio in the correct (or appropriate) direction in space. To do this the streamed audio signal can be applied a Head-Related Transfer Function (HRTF). HRTF(L/R, D, f) is a function of side of the head (Left and Right, L/R), the direction (D) in space and frequency (f) as dependent variables. So, a sound arriving from the right side of the user will arrive later at the left ear than the right ear, and at lower sound pressure level (SPL) at the left ear than the right ear and the SPL difference will be larger at higher frequencies. Panning (comprising a model with head shadow included) may alternatively or additionally be used.

FIG. 1A shows how streamed sound (cf. dashed arrow denoted 'S') can be presented to the user wearing a binaural hearing aid system (comprising left right hearing instruments, black rectangles (denoted HI) located on top of the outer ear(s) of the user, U), as arriving from a certain (fixed) direction, like 45° to the left of the hearing aid user (relative to a direction of the user's head, the direction of the user's head being e.g. defined by the nose of the user).

Figure 1B:
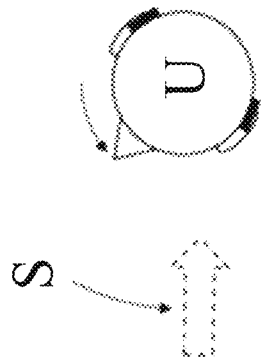
FIG. 1B shows a situation where the hearing aid user is turning the head towards the sound source in FIG. 1A without the use of head tracking resulting in the streamed sound also being turned and will continue to appear coming from 45° to the left of the user.

FIG. 1B shows a situation as in FIG. 1A, but where the hearing aid user is turning the head without the use of head tracking resulting (under the assumptions of FIG. 1A) in the streamed sound also being turned resulting in that the streamed sound will continue to appear as coming from 45° to the left of the user (i.e. from another location in the space (e.g. a room) around the user than in FIG. 1A).

Figure 1C:
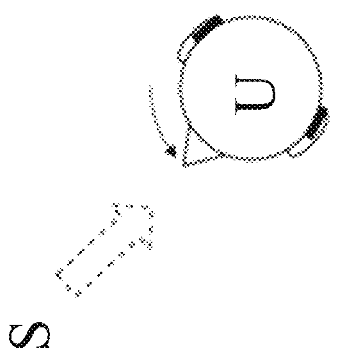
FIG. 1C shows a situation using head tracking (and application of current binaural spatial cues), where the streamed sound can be fixed in space to it's original location when the user's head is turned.

FIG. 1C shows a situation as in FIG. 1B, but using head tracking, where the streamed sound can be fixed in space, even when the user's head is turned (here 45° to the left).

Figure 2C:
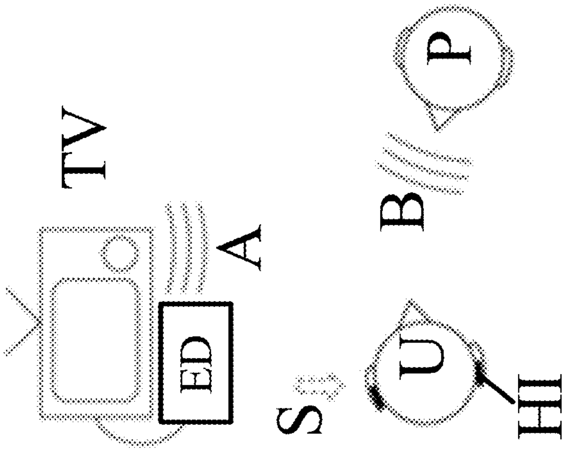
FIG. 2C shows the same situation as in FIG. 2B but where head tracking (and application of current binaural spatial cues) is used in the binaural hearing aid system to make it is possible for the user (U) to perceive the streamed sound (S) to still arrive from the direction of the TV, when the user turns the head to listen to person (P)
Figure 2B:
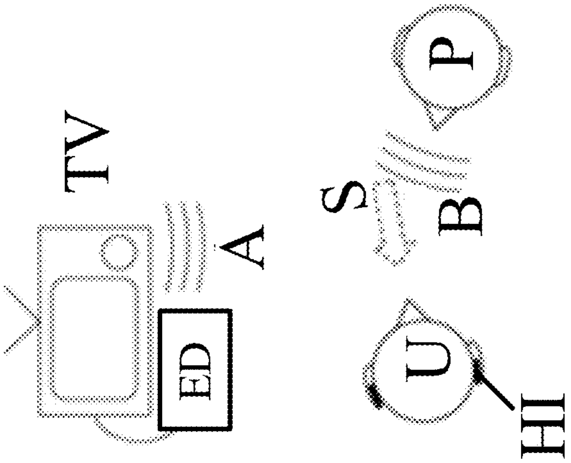
FIG. 2B shows the same situation as in FIG. 2A but where the further person (P) is talking to the user (U), and the user turns the head towards person, in which case the streamed sound (S) (if not spatially modified) will still appear to arrive from the front of the user and hence can disturb the user's understanding of what person (P) is saying.
Figure 2A:
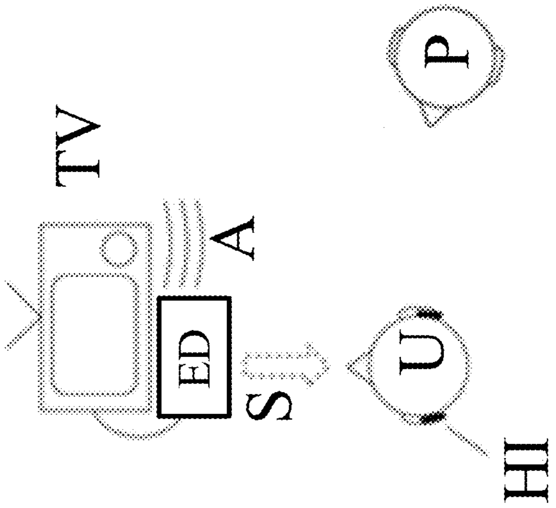
FIG. 2A shows a TV use case comprising a user (U) and a further person (P), where the user (U) wearing the binaural hearing aid system receives the streamed sound (S) from a TV-adapter (ED), connected to or integrated with the TV, and where the streamed sound appears to arrive from the front of the user, while the user is looking at the TV and also receives airborne sound from the TV loudspeaker (possibly amplified through the hearing aids)

FIG. 2A shows a TV-use case comprising a user (U) and a further person (P), where the user (U) wearing the binaural hearing aid system (comprising left and right hearing instruments (HI), as in FIG. 1A, 1B, 1C) receives the streamed sound (cf. dashed arrow denoted 'S') from a TV-adapter (ED), connected to or integrated with the TV set (TV, and wirelessly transmitting the TV-sound), and where the streamed sound appears to arrive from the front of the user, while the user is looking at the TV and also receives airborne sound (denoted 'A' in FIG. 2A, 2B, 2C) from the TV loudspeaker (possibly amplified through the hearing aids). EP3373603A1 relates to an exemplary handling of the simultaneous reception of streamed and acoustic sound from the TV at a hearing aid.

FIG. 2B shows the same situation as in FIG. 2A but where the further person (P) is talking to the user (U) (cf. sound 'B' propagated in a direction of the user U), and the user turns the head towards the person (P). In the absence of head tracking capability, the streamed sound (represented by dashed arrow 'S') will, however, still appear to arrive from the front of the user and hence approximately coincide with the (acoustically propagated) sound (B) from the further person (P), which may disturb the user's understanding of what person (P) is saying.

FIG. 2C shows the same situation as in FIG. 2B but where head tracking is used in the binaural hearing aid system to make it possible for the user (U) to perceive the streamed sound (S) to still arrive from the direction of the TV, when the user turns the head to listen to person (P). It is also possible to attenuate the streamed signal (S) when the user (U) is not facing the TV to improve the speech understanding of what person (P) is saying.

Figure 3A:
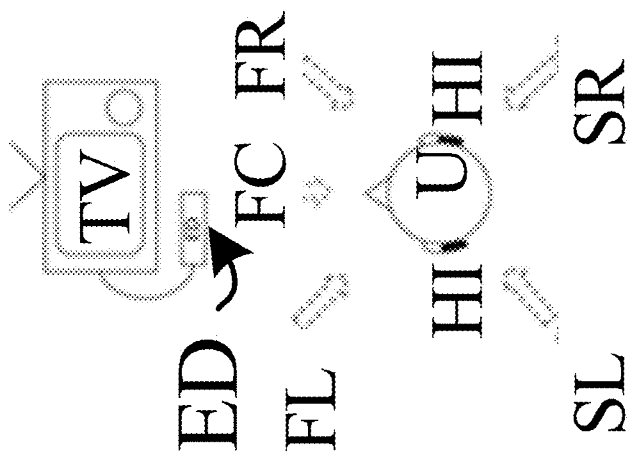
FIG. 3A shows a scenario as in FIG. 2A (but without the further person (P)) and where surround sound audio signals are streamed from the TV-adapter to the user's hearing aids and presented to arrive from standard surround sound speaker positions, here a 5 channel audio signal with front-left, -centre and -right (FL, FC, and FR) speaker signals and rear surround-left and -right (SL and SR) speaker signals.

FIG. 3A shows a scenario as in FIG. 2A (but without the further person (P)) where the hearing aid user (U) is looking directly at the TV set (TV) and where surround sound audio signals are streamed from the TV-adapter (ED) connected to the TV-set and configured to stream sound from the TV to the user's hearing aids (HI). The surround sound is arranged to arrive from standard surround sound speaker positions, here a 5 channel audio signal with front-left, -centre and -right (FL, FC, and FR) speaker signals (cf. dashed arrows denoted 'FL', 'FC', 'FR') and the rear surround-left and -right (SL and SR) speaker signals (cf. dashed arrows denoted 'SL', 'SR').

Figure 3B:
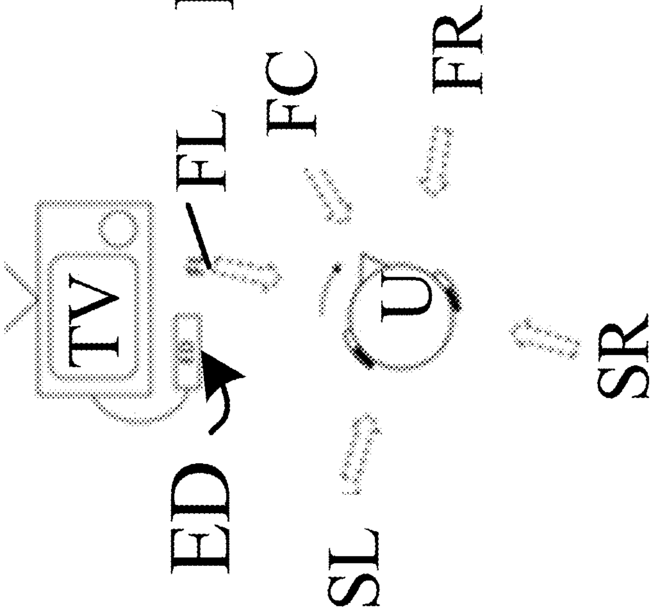
FIG. 3B shows the same situation as in FIG. 3A but where the user has turned the head away from the TV, and where the binaural hearing aid system is not equipped with head tracking capability, so the streamed surround signal will follow the users head and will not be perceived externalized for the user.

FIG. 3B shows the same situation as in FIG. 3A but where the user (U) has turned the head away from the TV, and where the binaural hearing aid system (HI, HI) is not equipped with head tracking capability, so the streamed surround signal will follow the users head and will not be perceived externalized for the user.

Figure 3C:
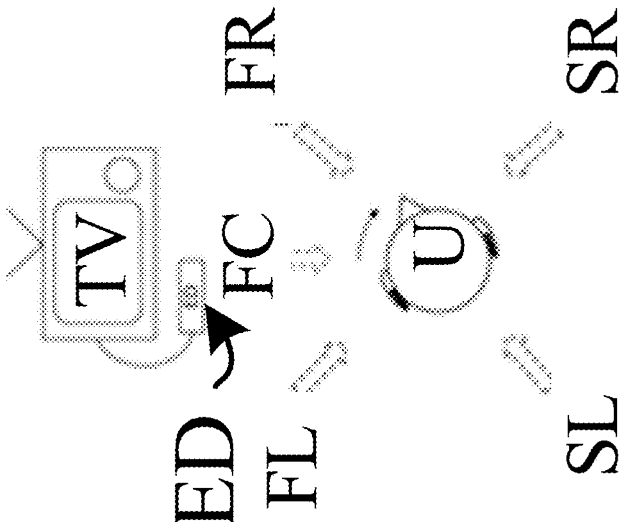
FIG. 3C shows the same situation as in FIG. 3B but where head tracking is used (and application of current binaural spatial cues) in the binaural hearing aid system to keep the sound sources in the correct places in space for a better externalized surround sound experience.

FIG. 3C shows the same situation as in FIG. 3B but where head tracking is used in the binaural hearing aid system to keep the sound sources in the correct places in space (as in FIG. 3A) for a better externalized surround sound experience.

Figure 4A:
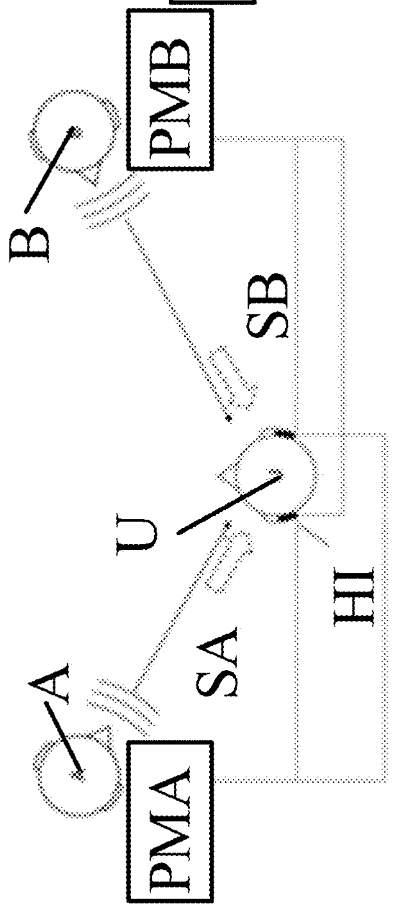
FIG. 4A shows a use case where the user (U) with hearing aids (HI) (looking straight ahead) receives a first wireless audio signal (SA) from a partner microphone (PMA), attached to a first person (A) to the left of the user, and a second wireless audio signal (SB) from a partner microphone (PMB), attached to a second person (B) to the right of the user, and wherein the audio is presented to the user (U) as arriving from the directions of the external partner microphones (PMA, PMB)

FIG. 4A shows a use case where the user (U) with hearing aids (HI) (looking straight ahead) receives a first wireless audio signal (cf. dashed arrow denoted 'SA') from a partner microphone (PMA), attached to a first person (A) to the left of the user, and a second wireless audio signal (cf. dashed arrow denoted 'SB') from a partner microphone (PMB), attached to a second person (B) to the right of the user, and wherein the audio is presented to the user (U) as arriving from the directions of the external partner microphones (PMA, PMB).

Figure 4B:
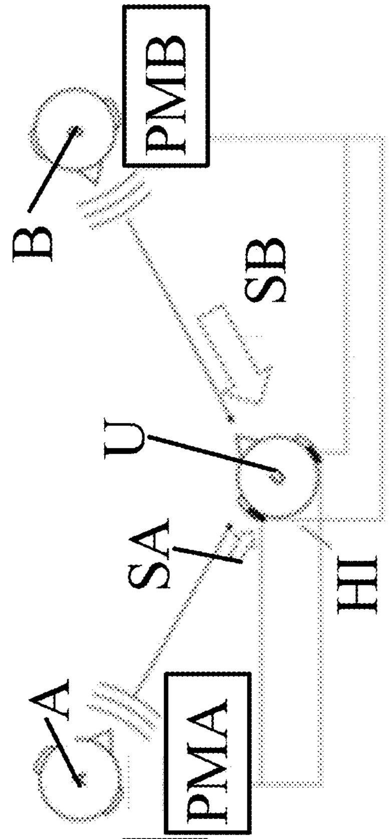
FIG. 4B shows the same situation as in FIG. 4A but where the user is looking to the right at second person (B) and where head tracking capability of the binaural hearing aid system (HI) makes it possible to detect the relative angle of the user's hearing aids and the remote partner microphones, so that when the user turns the head facing the second person (B), then the streamed sound (SB) from the second person (B) will be perceived as arriving from the frontal direction, and the streamed signal (SA) from the first person (A) will be moved further back.

FIG. 4B shows the same situation as in FIG. 4A but where the user is looking to the right at second person (B) and where head tracking capability of the binaural hearing aid system (HI) makes it possible to detect the relative angle of the user's hearing aids and the remote partner microphones, so that when the user turns the head facing the second person (B), then the streamed sound (SB) from the second person (B) will be perceived as arriving from the frontal direction of the user (direction of the nose), and the streamed signal (SA) from the first person (A) will be moved further back. Additionally, the streamed sound (SB) from the second person (B) can be amplified further to enhance speech understanding of speaker (B), while the streamed signal (SA) from the first person (A) can be attenuated (but not turned off to keep awareness by the user (U) of person (A)).

Figure 5:
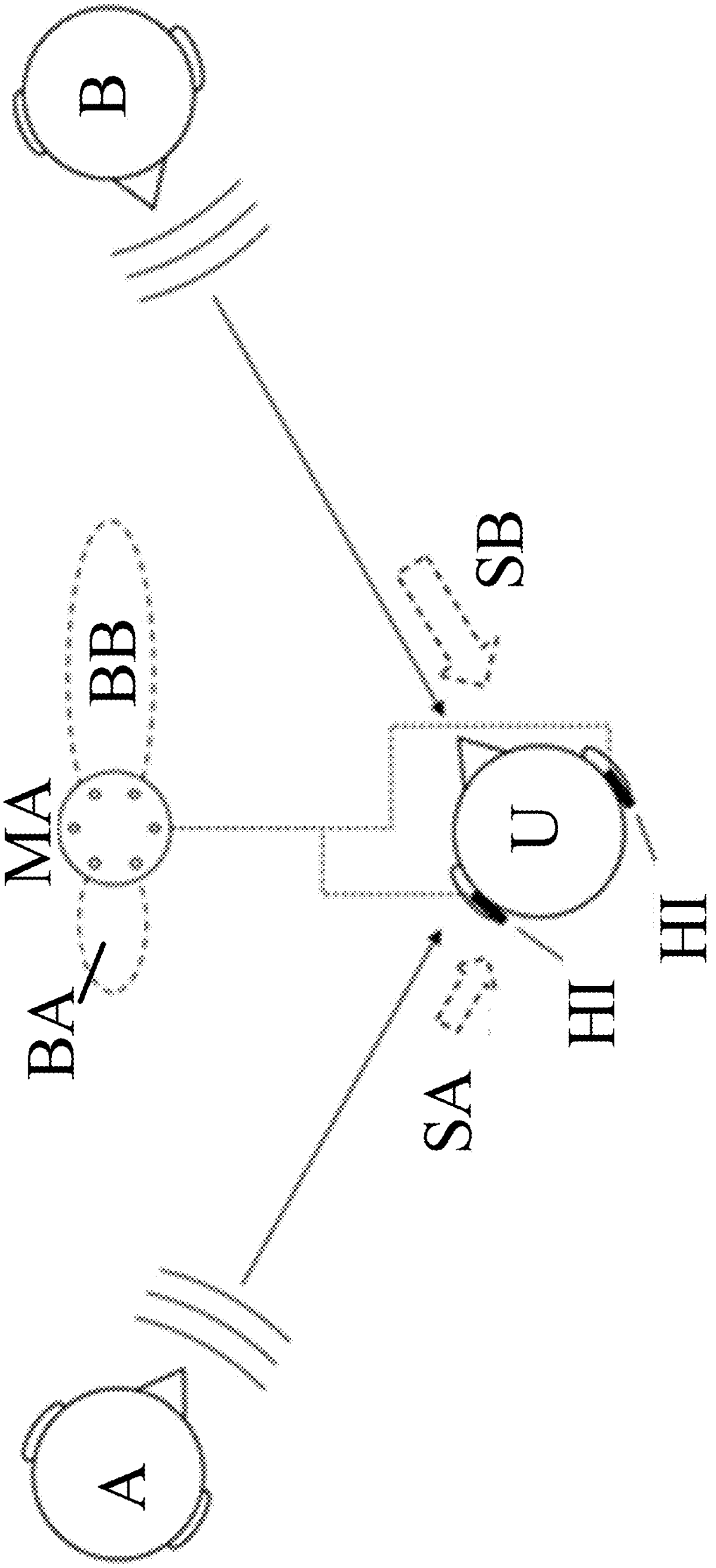
FIG. 5 shows a scenario where the user (U) wearing the binaural hearing aid system (HI) is located in proximity of an external microphone array (MA) capable of beamforming in multiple directions for enhancing individual speakers (A, B) present in the room or location.

FIG. 5 shows a scenario where the user (U) wearing the binaural hearing aid system (HI, HI) is located in proximity of an external microphone array (MA) capable of beamforming in multiple directions for enhancing individual speakers (A, B) present in the room or location. The beamformer can pick up speech from a first person (A) with a first beamformer pattern (BA) and pick up speech from a second person (B) with a second beamformer pattern (BB). The outputs from the first a second beamformer patterns (BA, BB) are streamed wirelessly to the binaural hearing aid system (HI, HI) worn by the user (U) and presented to the user as arriving from different directions (SA) and (SB). The system is also able to detect the user's head orientation relative to the external microphone array (MA) (e.g. using accelerometer and/or magnetometer and/or gyroscope in the hearing aids) and use this both to select which streamed beampattern to enhance and also to place them correctly in space. Knowing the head orientation relative to the external microphone array a presentation of the streamed sound from the MA to the user in a direction close to the true direction of the actual source. Additionally, we may thereby extract the intent of the user, and control the signal from the external beamformer of the MA (to enhance the beam in the direction the user is looking).

An example of detecting the position of the user relative to the external microphone array (MA), may be to use an own voice detector in the hearing aid as input to the external microphone array to detect the angle relative to the user, by correlating to the microphone array beam direction.

Alternatively, or additionally, the external microphone array (MA) may be configured to emit an ultra-sonic signal that the hearing aid microphones pick up, and wherein the hearing aid (or hearing aid system) is configured to use to determine the user head orientation relative to the external microphone array.

Alternatively, or additionally, the external microphone array (MA) may be configured to use the Bluetooth 5.1 parameter 'angle of arrival' (AOA). Using a Bluetooth connection between the microphone array (transmitter) and the hearing aid(s) of the binaural hearing aid system (receiver), a constant tone extension can be added to the communication between the transmitter and receiver. When receiving a constant-phase; you can measure the delta-phase, when switching between different antennas. With the knowledge of the antenna distance, the angle from where the signal arrives can be calculated. The formula for estimating the angle of arrival based on the phase difference is given by $$\theta = \arccos\left(\frac{\psi\lambda}{2\pi d}\right)$$

where θ is the angle of arrival, ψ is the phase difference, λ is the wavelength, and d is the antenna distance.

Furthermore, the distance between the transmitter and receiver, and thereby the distance between the hearing aid user and the connected device, can be determined by time of flight (ToF) (time difference between the signal being sent and received) defined by the propagation speed of the signal. This can be used to determine the exact position (e.g. the distance, D) of the user relative to the streaming device which in turn can be used as input for the spatial processing of the streamed sound.

Figure 6:
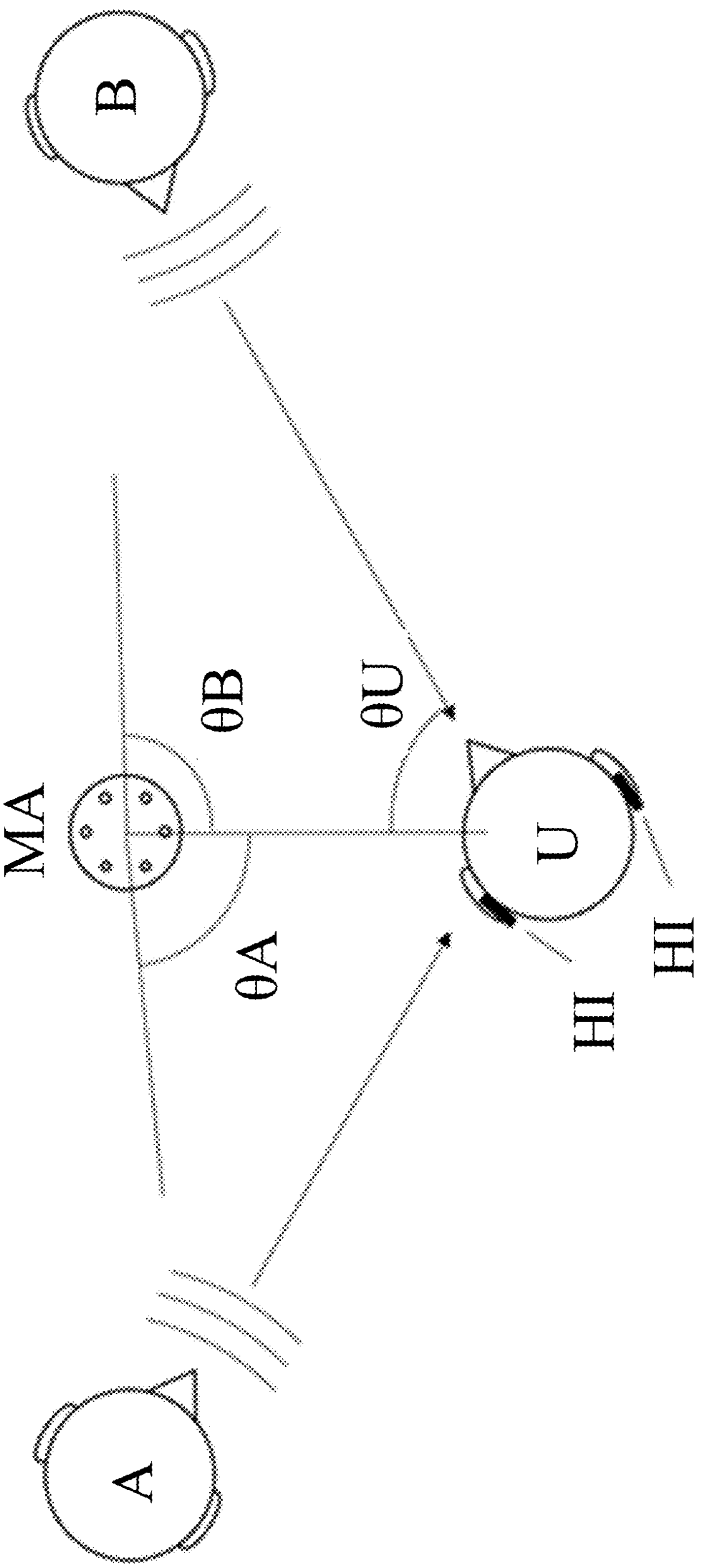
FIG. 6 shows a scenario as in FIG. 5 comprising a user (U) wearing a binaural hearing aid system (HI) located in proximity of an external microphone array (MA), where the user's position relative to the position of first and second speakers (A, B) can be measured as θA and θB.

In a further aspect of the present disclosure, some of the use cases for streaming are enhanced by measuring the relative angle of the hearing aid user relative to the streaming source. This is particularly useful for the table microphone- (MA) and partner microphone (PM)-use cases (FIGS. 5, 6 and FIGS. 4A, 4B, respectively), where a user is not necessarily going to be facing the direction of the streaming source. In this way, the system can ascertain which direction the user is relative to the streaming source and then place the positional audio correctly, as shown in FIG. 6. In addition, if the streaming source is moved or turned, it can adjust and compensate. Systems used for measurement of the relative angle of the streaming source to the user may e.g. include one or more of:

- RF Time of Flight (ToF) techniques, including Angle of Arrival and Angle of Departure measurements using an antenna array on the remote microphone. RF-techniques may include:

Bluetooth

WiFi

Other 2.4 GHz transmission technologies

Ultra Wideband.

Sound (potentially ultrasonic) transmitted by the hearing aid and picked up by the beam forming microphones of an external microphone array (e.g. a table microphone).

User's voice recognition, where the users' voice is known, and the beam forming microphone positions the user's direction by identifying where their voice is coming from.

FIG. 6 shows a scenario as in FIG. 5 comprising a user (U) wearing a binaural hearing aid system (HI, HI) located in proximity of an external microphone array (MA), where the user's position relative to the position of first and second speakers (A, B) can be measured as angles θA and θB (using the microphone array (MA) as centre point, origo). The angle of the user's head would also be measured (e.g. with a head tracker) and can be defined relative to the direction of the streaming unit (MA) as θU. These data points can be used to accurately place the voices in space for the user, even if the absolute rotational position of the microphone array (MA) is uncontrolled.

The use case with a table microphone (MA) described in FIG. 5 and FIG. 6 may e.g. be implemented by including a first order Ambisonics microphone system in the table microphone. First-order Ambisonics consists of four signals corresponding to one omnidirectional and three figure-of-eight polar patterns aligned with the Cartesian axes. These signals may be obtained from a matched pair of dual-diaphragm microphones, where each diaphragm output is accessible individually. The processing of the signal can be done either in the table microphone unit or locally in the hearing aid(s).

The system may be configured to support the surround codecs on the market (Dolby, DTS, B-Format first-order Ambisonics, Opus). From multichannel to two channel surround sound.

In the following FIGS. 7A, 7B, 7C, 7D, 7E, 7F, 7G and 7H, various embodiments of a binaural hearing system (e.g. a binaural hearing aid system) according to the present disclosure are described.

Figure 7A:
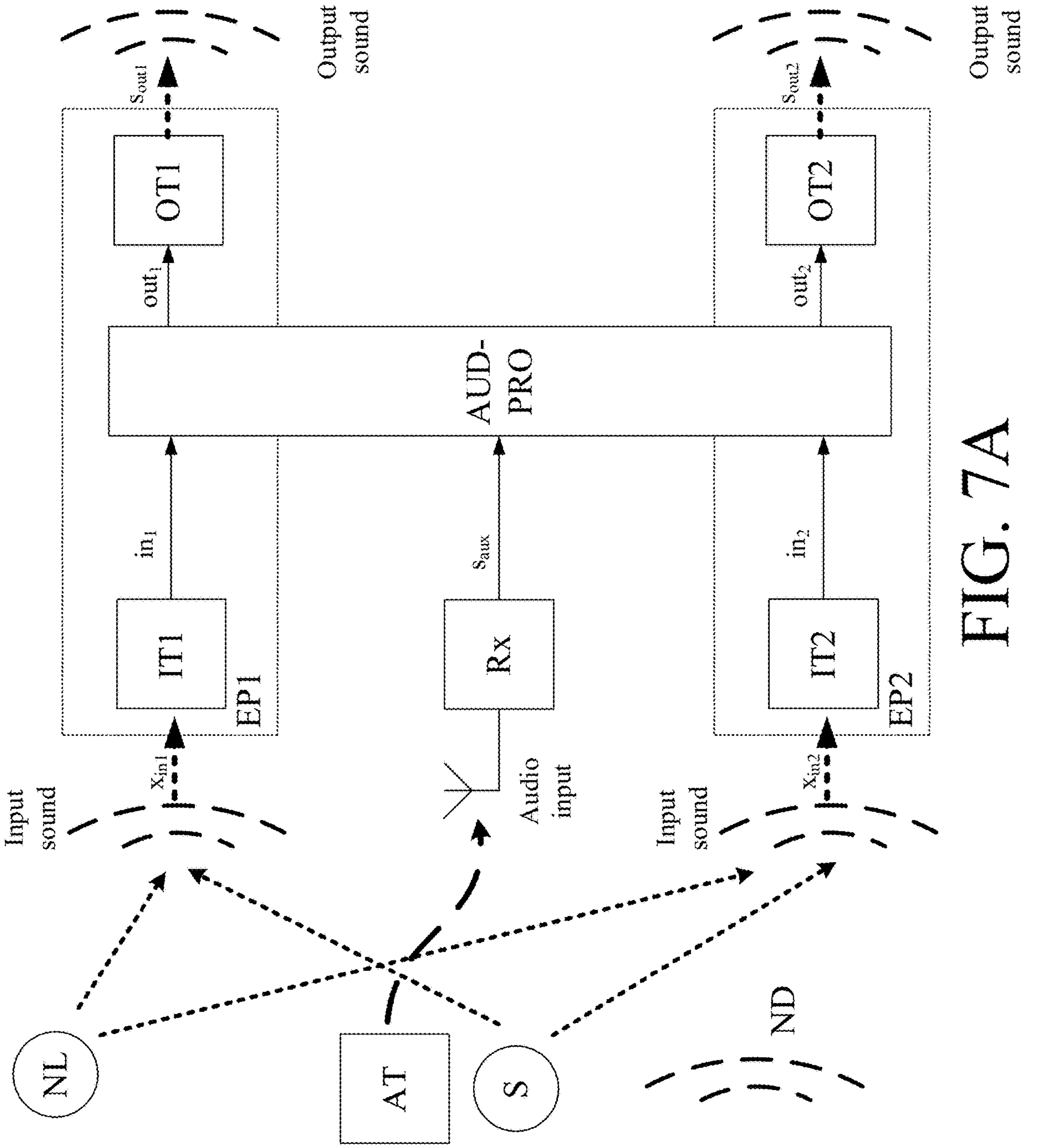
FIG. 7A shows a first embodiment of a binaural hearing system according to the present disclosure.

FIG. 7A shows a first embodiment of a binaural hearing system (e.g. a binaural hearing aid system) according to the present disclosure. The binaural hearing aid system comprises first and second earpieces (EP1, EP2) adapted for being located at or in left and right ears, respectively, of a user. The first and second earpieces (EP1, EP2) may form part of or be constituted by respective first and second hearing aids. Each of the first and second earpieces comprises an input transducer (IT1, IT2, respectively) for converting respective first and second acoustically propagated signals ($x_{in1}$, $x_{in2}$) impinging on the first and second earpieces to first and second electric sound input signals ($in_1$, $in_2$) respectively. Each of the received acoustically propagated signals ($x_{in1}$, $x_{in2}$) may comprise a target signal from a target sound source (S) and other signals from other sound sources ((NL, ND), e.g. representing localized or diffuse noise) in an environment around the user. Each of the first and second earpieces (EP1, EP2) further comprises an output transducer (OT1, OT2, respectively) configured to receive and convert respective first and second binaurally processed electric output signals ($out_1$, $out_2$) to stimuli ($s_{out1}$, $s_{out2}$) perceivable as sound by the user.

The binaural hearing (aid) system further comprises at least one wireless receiver (Rx) for receiving a wirelessly transmitted signal from an audio transmitter (AT) and for retrieving therefrom at least one streamed audio input signal ($s_{aux}$) comprising the target signal from the target sound source (S) and optionally other signals (or signal components) from the other sound sources (NL, ND) in the environment around the user. The audio communication link between the audio transmitter (AT) and the binaural hearing aid system (here the audio receiver (Rx))—indicated by a bold dashed arrow from transmitter (AT) to receiver (Rx) in FIG. 7A, 7B, 7D, 7E, 7G, 7H may e.g. be based on Bluetooth or similar (relative short range) communication technology for use in connection with portable (relatively low power) devices.

The binaural hearing (aid) system further comprises a binaural audio signal processor (AUD-PRO) configured to receive the at least one streamed audio signal ($s_{aux}$) and the first and second electric sound input signals ($in_1$, $in_2$) (or signals originating therefrom) and to provide the respective first and second binaurally processed electric output signals ($out_1$, $out_2$) in dependence thereof. The binaural audio signal processor (BIN-PRO) is further configured to apply binaural spatial processing to the at least one streamed audio input signal ($s_{aux}$) (or to a signal or signals originating therefrom) and to provide said respective first and second binaurally processed electric output signals ($out_1$, $out_2$), which provide a spatial sense of origin external to said user's head of the target sound source, in dependence of one or more of A) the at least one streamed audio input signal ($s_{aux}$) and the first and second electric sound input signals ($in_1$, $in_2$), and B) said at least one streamed audio input signal ($s_{aux}$) and an estimate of a position (D, θ) of the target sound source (S) relative to the user's head (U) (cf. e.g. FIG. 8B).

Each of the input transducers (IT1, IT2) may comprise a noise reduction algorithm configured to reduce noise in the resulting electric sound input signal ($in_1$, $in_2$). Likewise, the wireless receiver (Rx) or the wireless receivers (Rx1, Rx2) may comprise a noise reduction algorithm configured to reduce noise in the resulting streamed audio input signal ($s_{aux}$; $s_{aux1}$, $s_{aux2}$).

Each of the input transducers (IT1, IT2) may e.g. comprise a multitude of microphones and a beamformer filter configured to provide the resulting electric sound input signal ($in_1$, $in_2$) as a beamformed signal.

Figure 7B:
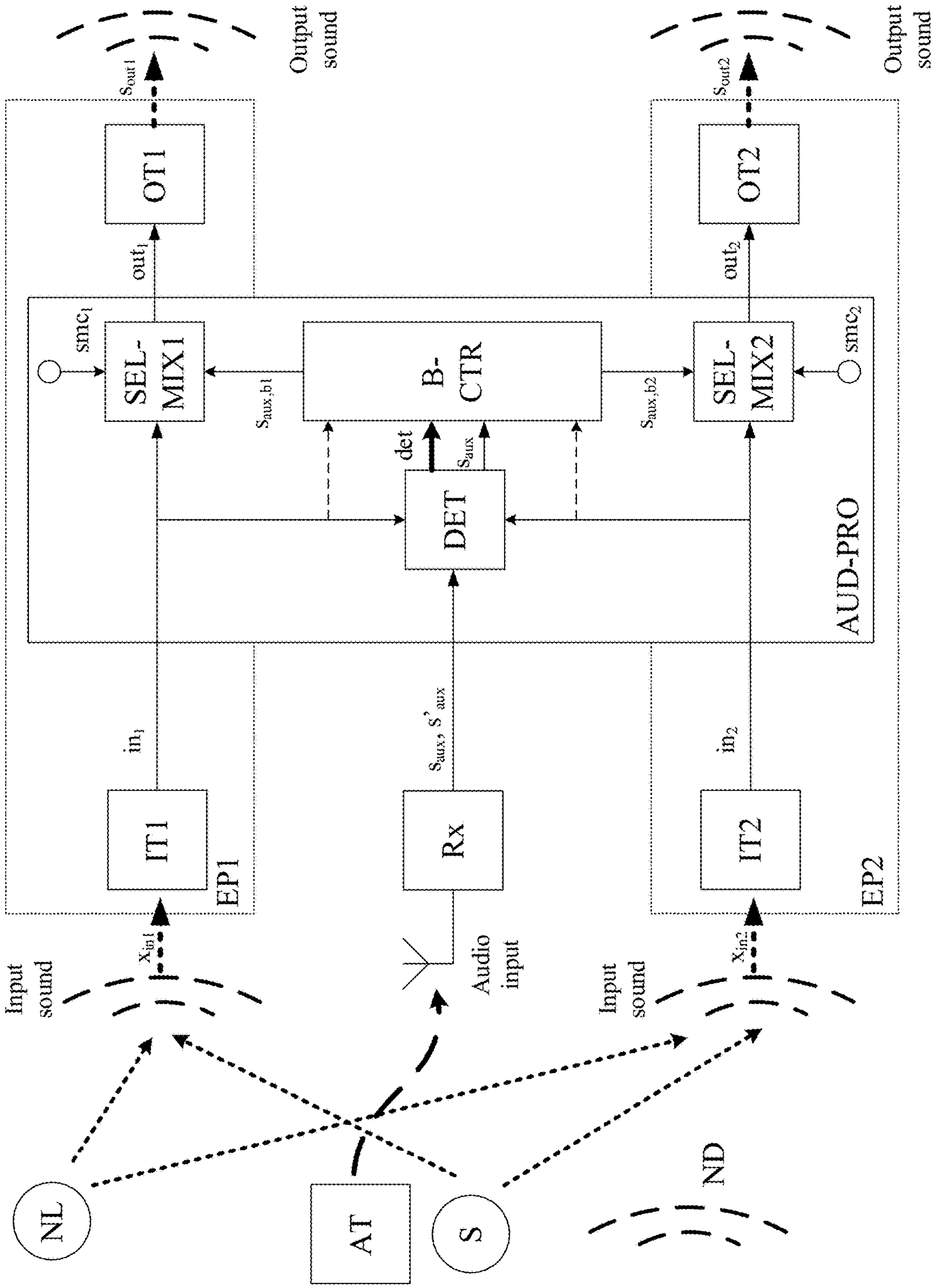
FIG. 7B shows a second embodiment of a binaural hearing system according to the present disclosure.

The binaural audio signal processor (AUD-PRO) may form part of one or both of the first and second earpieces (EP1, EP2) or be located (e.g. mainly, e.g. apart from a selector or mixer of two audio signals located in the respective earpieces, see e.g. units SEL-MIX1, SEL-MIX2 in FIG. 7B) in a separate processing device in communication with the first and second earpieces (in which case appropriate transmitter and receiver circuitry for transmitting and receiving the binaurally processed electric output signals ($out_1$, $out_2$) in FIG. 7A or ($s_{ayx,b1}$, $s_{aux,b2}$) in FIG. 7B) may be included in the separate processing device and the first and second earpieces, respectively).

FIG. 7B shows a further embodiment of a binaural hearing system (e.g. a binaural hearing aid system) according to the present disclosure. The embodiment of a binaural hearing aid system of FIG. 7B is similar to the embodiment of FIG. 7A, but the embodiment of the binaural audio signal processor (AUD-PRO) of FIG. 7B is shown in more detail.

The embodiment of a binaural hearing aid system of FIG. 7B, e.g. (as shown) the binaural audio signal processor (AUD-PRO), comprises one or more detectors (DET), e.g. constituted by or comprising a position detector, providing respective one of more detector control signals (det). The binaural audio signal processor (AUD-PRO) comprises a binaural controller (B-CTR) configured to provide the respective first and second binaurally processed electric output signals ($s_{aux,b1}$, $s_{aux,b2}$; $out_1$, $out_2$) in dependence of the one or more detectors (DET), e.g. including a position detector, e.g. in dependence of the one of more detector control signals (det) (and the at least one streamed audio input signal ($s_{aux}$)). The one or more detector control signals (det) are indicated by the bold arrow denoted 'det' to indicate the option of its representation of more than one detector control signal (e.g. signals DOA, DE, LDCS, RCS from respective exemplary detectors of a) direction of arrival, b) distance, c) look direction of the user, and d) wireless reception) in the embodiment of a detector unit (DET) illustrated in FIG. 7C).

The one or more detectors (DET) may comprise one or more of a wireless reception detector (WRD), a position detector (PD), a voice activity detector (estimator) (VAD), e.g. a general voice activity detector (e.g. a speech detector), and/or an own voice detector (OVD), a movement detector (MD), a brain wave detector (BWD), etc.

Figure 7C:
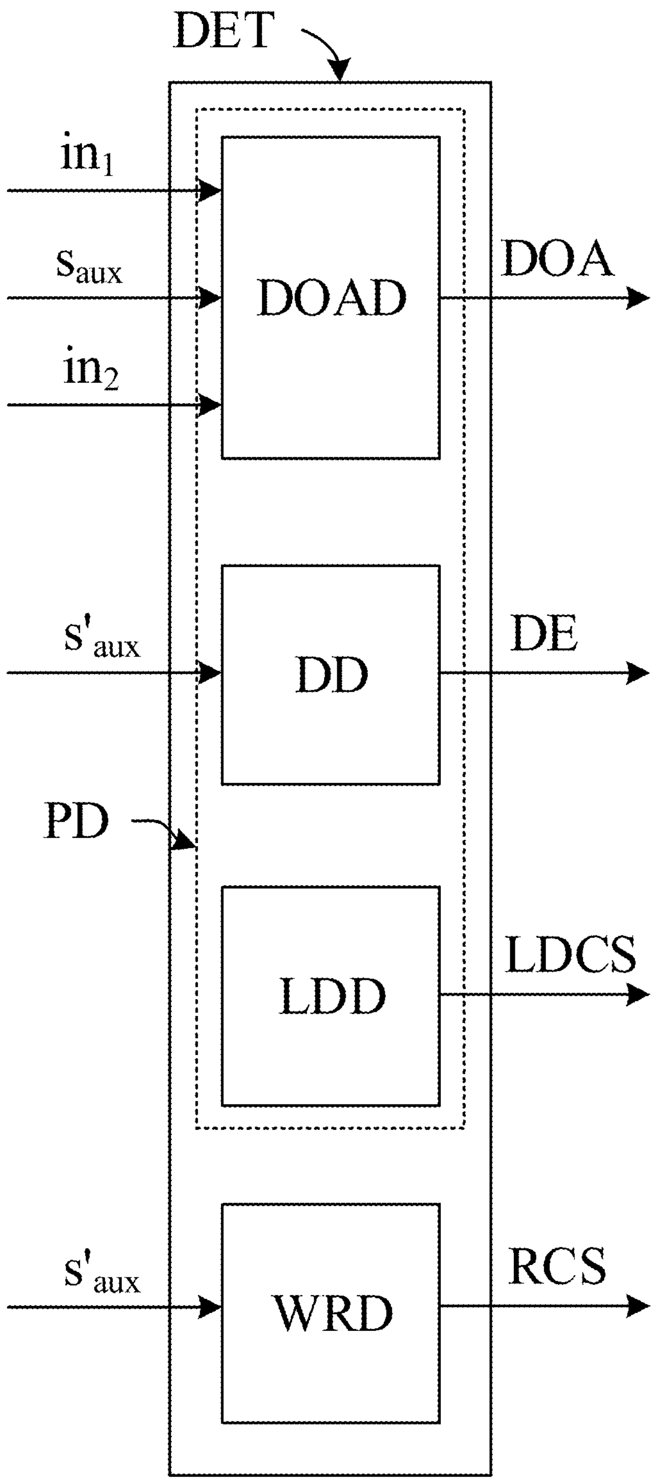
FIG. 7C schematically shows an embodiment of a detection unit for use in a binaural hearing system according to the present disclosure.

An example of a detection unit (DET) comprising one or more detectors is illustrated in FIG. 7C. The detection unit (DET) comprises a position detector (PD) providing a number of position detector control signals and a wireless reception detector (WRD) providing a reception control signal (RCS). The position detector (PD) (cf. dotted enclosure in FIG. 7C) comprises a Direction Of Arrival-detector (DOAD), a distance detector (DD) and a look direction detector (LDD), providing respective detector control signals (DOA, DE, and LDCS) as described below. The position detector may further comprise a level detector for estimating a current level of an input signal, or a motion detector for tracking a user's motion.

The position detector (PD) is configured to estimate a position (TPOS) of the target sound source relative to the user's head (e.g. to the earpieces (or hearing aids) of the binaural hearing aid system). The estimate of the position of the target sound source relative to the user's head may be determined as a combination of a) an angle (θ) between a1) a line from the position of the target sound source (S) to the head (U, e.g. its mid-point) of the user and a2) a reference direction, e.g. a line parallel to a normal forward-looking direction of a user (both lines being located in a horizontal plane) and/or b) a distance (D) between the target sound source (S) and the user's head (U) (e.g. its mid-point, or to each of the first and second input transducers (IT1, IT2, respectively)). In other words, the position ($x_s$, $y_s$) of the target sound source (S) may be expressed in polar coordinates as (D, θ), when the coordinate system has its origo in the (middle of the) user's head (see e.g. FIG. 8B, e.g. the bold dot indicating the location of the z axis in the x-y plane).

An estimate of the position ($x_s$, $y_s$; D, θ) of the target sound source (S) relative to the user's head may be fully or partially determined as (approximated by) an angle (θ) relative to a reference direction, e.g. a normal forward-looking direction of a user, cf. e.g. FIG. 8B. 'A normal forward-looking direction of a user' (cf. 'NLD' in FIG. 8B, here equal to the 'current' look direction (LDIR)) may be defined as a direction the user looks when his or her head is in a normal forward-looking position relative to the torso (TSO) of the user, i.e. in a horizontal direction (see e.g. axis 'x' in FIG. 8A, 8B) perpendicular to a line though the shoulders of the user (see e.g. axis 'y' in FIG. 8A, 8B).

Figure 8A:
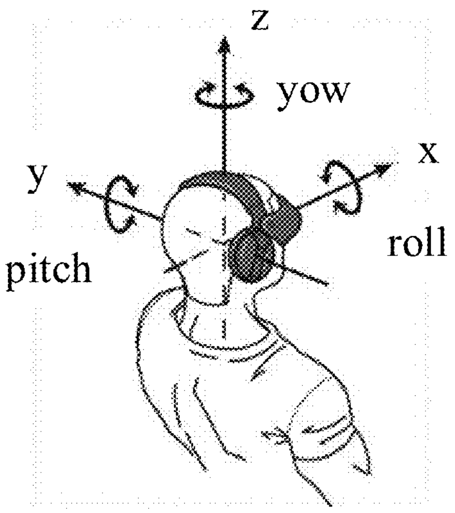
FIG. 8B schematically illustrates the position of a target sound source relative to the user.
Figure 8B:
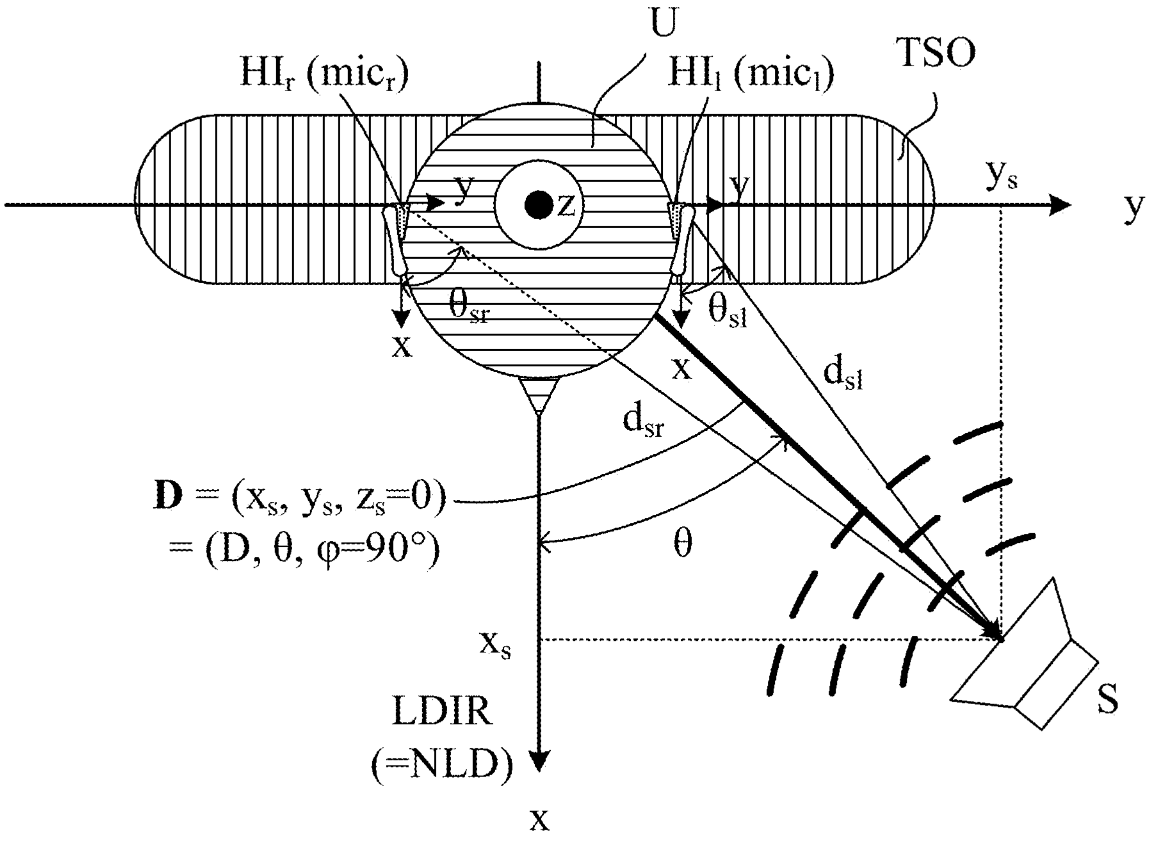

The position detector (PD) may comprise a look direction detector (LDD) (e.g. a head tracker) configured to provide a look direction control signal (LDCS) indicative of a current look direction (LDIR) of the user relative to a direction to the position ((D, θ) of the target sound source (S), in practice the angle θ in FIG. 8B. The look direction detector (LDD) may e.g. comprise one or more of a gyroscope, an accelerometer, and a magnetometer, e.g. a gyroscope and an accelerometer. The look direction detector (LDD) may comprise or be constituted by a head tacker configured to track an angle of rotation of the user's head compared to a normal forward-looking direction (NLD) of the user to thereby estimate, or contribute to the estimation of, the position of the target sound source relative to the user's head. The angle of rotation of the user's head (e.g. relative to a normal forward-looking direction (NLD)) may e.g. be provided by a head tracker, e.g. based on 1D, 2D or 3D gyroscopes, and/or 1D, 2D or 3D accelerometers, and/or 1D, 2D or 3D magnetometers (such devices sometimes known under the common term 'Inertial Measurements Units' (IMUs)), cf. e.g. EP3477964A1.

The position detector (PD), e.g. the look direction detector (LDD), may comprise an eye tracker allowing to estimate a current eye gaze angle of the user relative to a current orientation of the user's head to thereby finetune the estimation of the position of the target sound source relative to the user's head. The current eye gaze angle of the user relative to a current orientation of the user's head may be represented by an angle relative to the current angle of rotation of the user's head. The eye gaze angle may thus be used as a modification (fine-tuning) of the position of the target sound source relative to the user's head, e.g. estimated as a sum of the angle of rotation of the user's head and the eye gaze angle (counted with sign, so that an eye gaze in the same direction as a head rotation has the same sign, whereas an eye gaze in the opposite direction of a head rotation has the opposite sign, $\theta_{pos}=\theta_{head}+\theta_{eye}$). The eye tracker may by based on one or more electrodes in contact with the user's skin to pick up potentials from the eyeballs. The electrodes may be located on a surface of a housing of the first and second hearing aids (e.g. the earpieces) and be configured to provide appropriate Electrooculography (EOG) signals, cf. e.g. EP3185590A1.

The position detector (PD) may comprise a direction of arrival detector (DOAD) configured to estimate a direction of arrival (DOA) of sound from the target sound source (S) in dependence of the streamed audio input signal ($s_{aux}$) and the first and the second electric sound input signals ($in_1$, $in_2$). A direction of arrival of sound from a target sound source may e.g. be estimated as disclosed in EP3285500A1.

An estimate of the position of the target sound source (S) relative to the user's head (U) may be fully or partially determined as (approximated by) a distance (D) between the target sound source and the user's head. The position detector (PD) may comprise a distance detector (estimator) (DD) providing a distance control signal (DE) indicative of a current estimate of a distance (D) between the position of the target sound source and the user's head. A distance between transmitting and receiving devices may e.g. be estimated by detecting a received signal strength (e.g. a "Received Signal Strength Indicator" (RSSI) or a "Received Channel Power Indicator" (RCPI)) in the receiving device (e.g. Rx in FIG. 7A, 7B, 7D or Rx1, Rx2 in FIG. 7E, 7G) and receiving a transmitted signal strength from the transmitting device (e.g. AT in FIG. 7A, 7B, 7D, 7E, 7G, 7H). The Bluetooth parameter 'High Accuracy Distance Measurement' (HADM) may likewise be used. The distance detector (DD) may thus base its estimate (DE) of the distance (D) on one or more parameters inherent in the received wireless signal (depending on the protocol of the wireless link), denoted $s'_{aux}$ in FIG. 7C, etc. The assumption that the position of the audio transmitter (AT) is representative of the position of the (acoustic) target audio source (S) is good, at least in some use cases, e.g. when the audio transmitter is (part of) a microphone unit worn by, or located close to, a target person, or is a TV-sound transmitter (or other audio transmitter associated with (e.g. integrated with) a target sound source).

The detector control signal(s) ('det' in FIG. 7B, 7D, 7E and signals DOA, DE, LDCS, RCS in FIG. 7C) are fed to the binaural controller (B-CTR) possibly for further processing (e.g. logic combination) and use in the provision of the binaural cues to the streamed audio input signal ($s_{aux}$).

The estimate of a position of the target sound source (S) relative to the user's head (U) may be provided as a user input. The binaural hearing aid system may comprise a user interface (e.g. implemented in an auxiliary device (e.g. a separate processing device of the system) in communication with or forming part of the binaural hearing aid system, see e.g. FIG. 9). The user interface (UI) may be configured to allow the user to indicate the current position of the target sound source (S) relative to the user's head, e.g. via a user operable activation element, e.g. one or more buttons, e.g. a touch sensitive screen and/or a key-board. The user interface (UI) may be configured to allow an indication of an angle or a position of the sound source (S) relative to the user's head in a normal forward-looking direction (e.g. the direction of the nose, cf. bold arrow in the user interface screen of FIG. 9). The user interface may be configured to allow the user to choose a current angle or position of the target sound source relative to the user based on a number of pre-defined positions (angles and/or distances), e.g. via a touch-screen interface depicting the user and a number of distinct selectable angles or positions (cf. e.g. FIG. 9).

The wireless reception detector (WRD) may be configured to provide a reception control signal (RCS) indicating whether or not the at least one streamed audio input signal ($s_{aux}$) comprising the target signal (and possibly second other signals from other sound sources in the environment around the user) is currently received. The wireless reception detector may form part of the wireless receiver (Rx; Rx1, Rx2), which, in dependence of the wireless communication protocol used (e.g. Bluetooth), may provide a 'no signal' indicator in case no valid (e.g. Bluetooth) signal is received by the receiver (Rx). The reception control signal (RCS) may be based on the received wireless signal (denoted $s'_{aux}$ in FIG. 7C), e.g. before the demodulation and extraction of the at least one streamed audio input signal ($s_{aux}$). The reception control signal (RCS) may be used as an enabling ('valid signal received') or disabling ('no valid signal received') parameter for the provision of the binaurally processed electric output signals ($s_{aux,b1}$, $s_{aux,b2}$; $out_1$, $out_2$).

The binaural audio signal processor (AUD-PRO) of the embodiment of FIG. 7B further comprises respective first and second selector/mixer units (SEL-MIX1, SEL-MIX2) configured to provide as an output ($out_1$, $out_2$, respectively) one of two inputs (($in_1$ or $s_{aux,b1}$) and ($in_2$ or $s_{aux,b2}$), respectively), or a (e.g. weighted) mixture of the two inputs ($out_1=w_{11}*in_1+w_{12}*s_{aux,b1}$, and $out_2=w_{21}*in_2+w_{22}*s_{aux,b2}$, respectively). In other words, in a 'selection mode' of operation, the outputs ($out_1$, $out_2$) of the respective first and second selector/mixer units (SEL-MIX1, SEL-MIX2) may be equal to the respective first and second binaurally processed electric output signals ($s_{aux,b1}$, $s_{aux,b2}$) or equal to the respective first and second electric sound input signals ($x_1$, $x_2$). In a 'mixing mode' of operation, the outputs ($out_1$, $out_2$) of the respective first and second selector/mixer units (SEL-MIX1, SEL-MIX2) are equal to a weighted mixture of the (first, second) electric sound input signals ($in_1$, $in_2$), or processed versions thereof, and the (first, second) binaurally processed electric output signals ($s_{aux,b1}$, $s_{aux,b2}$), the latter being based on the at least one streamed audio input signal ($s_{aux}$) modified to provide a spatial sense of origin (external to the user's head) of the target sound source (S). The first and second selector/mixer units (SEL-MIX1, SEL-MIX2) may be controlled by respective select-mix control signals ($smc_1$, $smc_2$), e.g. dependent on the reception control signal (RCS) from the wireless reception detector (WRD). An enabling value of RCS (indicating 'valid signal received') may initiate the 'mixing mode' of operation of the selector/mixer units (or the 'select mode' with the outputs ($out_1$, $out_2$) of the respective first and second selector/mixer units (SEL-MIX1, SEL-MIX2) being equal to the respective first and second binaurally processed electric output signals ($s_{aux,b1}$, $s_{aux,b2}$)). A disabling value of RCS ('no valid signal received') may initiate he 'selection mode' of operation of the selector/mixer units, where the outputs ($out_1$, $out_2$) are set equal to the respective first and second electric sound input signals ($x_1$, $x_2$), corresponding to independent (monaural) operation of the first and second earpieces (EP1, EP2), e.g. hearing aids.

Tracking the position of the target audio sound source (S) relative to the orientation of the user's head (U) may be used to control the amplification of standard amplified sound of the hearing aids while streaming. When a user, for example, is looking at the TV (including a TV-audio sound transmitter), then the ambient sound amplification (based on microphone inputs) may be automatically reduced, and when the user looks away from the TV, then the ambient sound amplification may be automatically increased.

The binaural audio signal processor (AUD-PRO) is configured to control the gain applied to the at least one streamed audio signal in dependence of the estimate of the position of the target sound source (S) relative to the user's head (U). Thereby the first and second binaurally processed electric output signals ($s_{aux,b1}$, $s_{aux,b2}$) or ($out_1$, $out_2$) providing a spatial sense of origin of the target sound source external to said user's head may be provided. E.g. when a user is looking in the direction of the target sound source (S) of the streamed sound, then the streamed sound amplification may be increased (and vice versa, e.g. decreased, if the look direction of the user deviates from the direction to the target sound source).

Figure 7D:
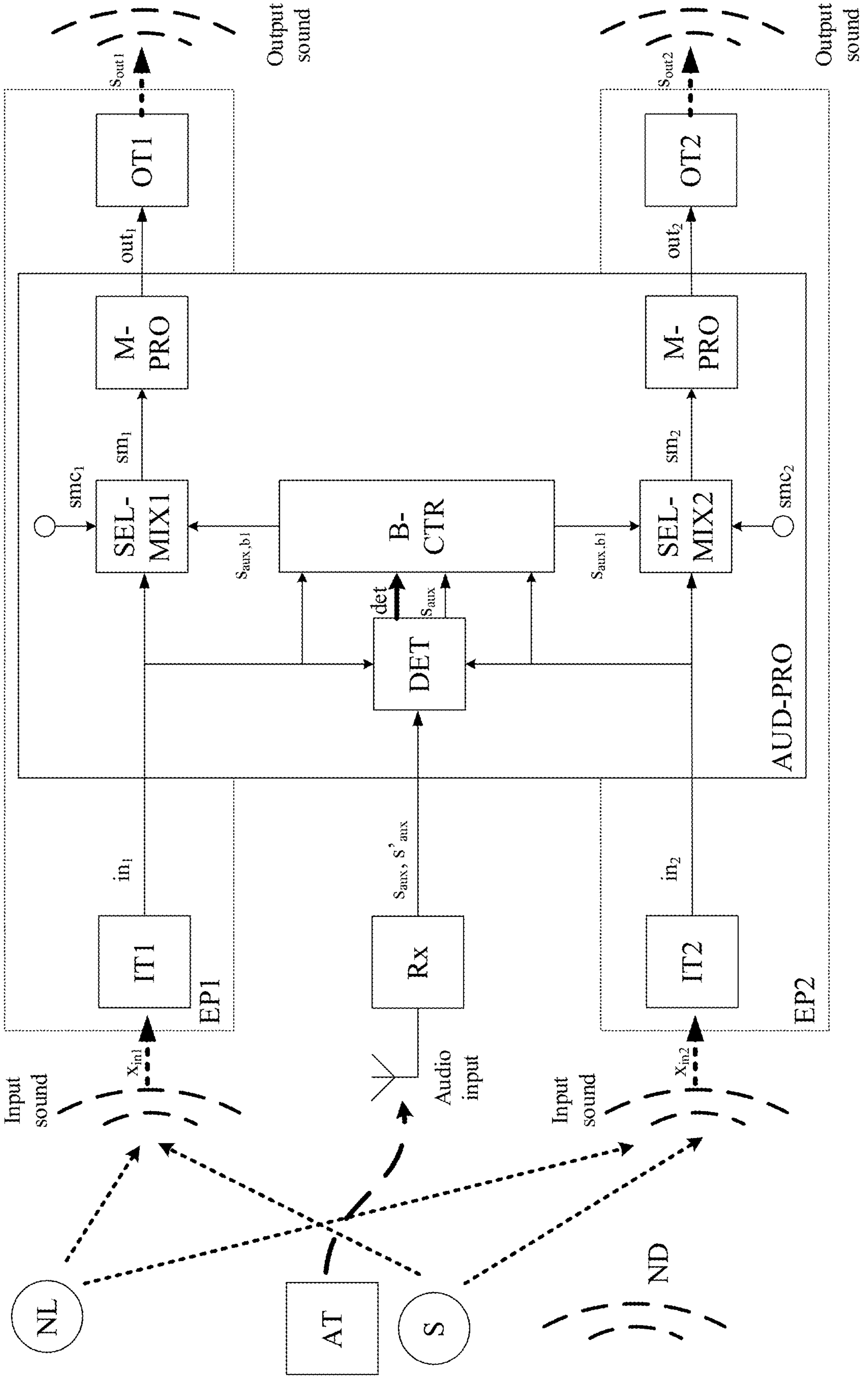
FIG. 7D shows a third embodiment of a binaural hearing system according to the present disclosure.
Figure 7E:
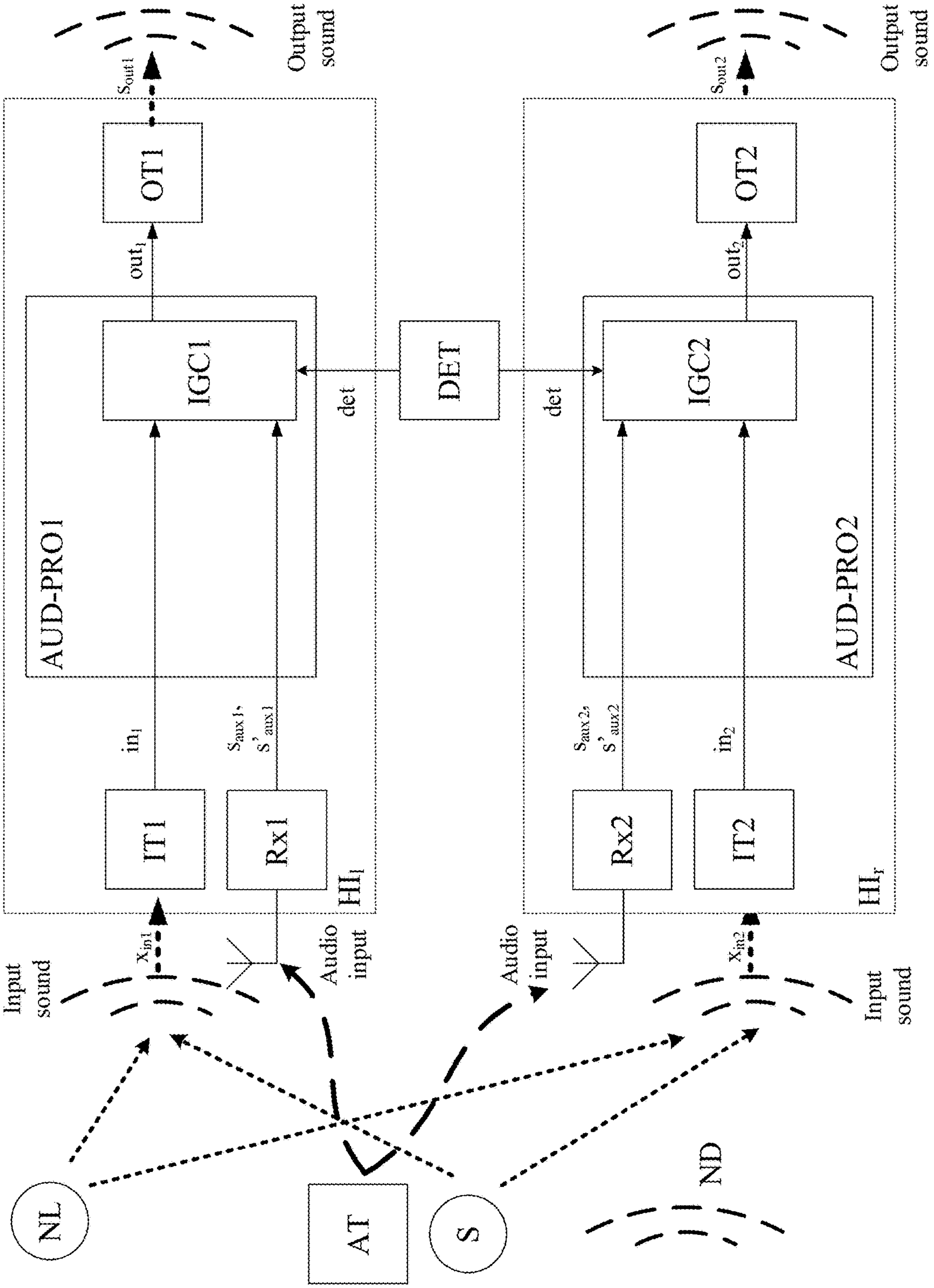
FIG. 7E shows a fourth embodiment of a binaural hearing system according to the present disclosure.
Figure 7F:
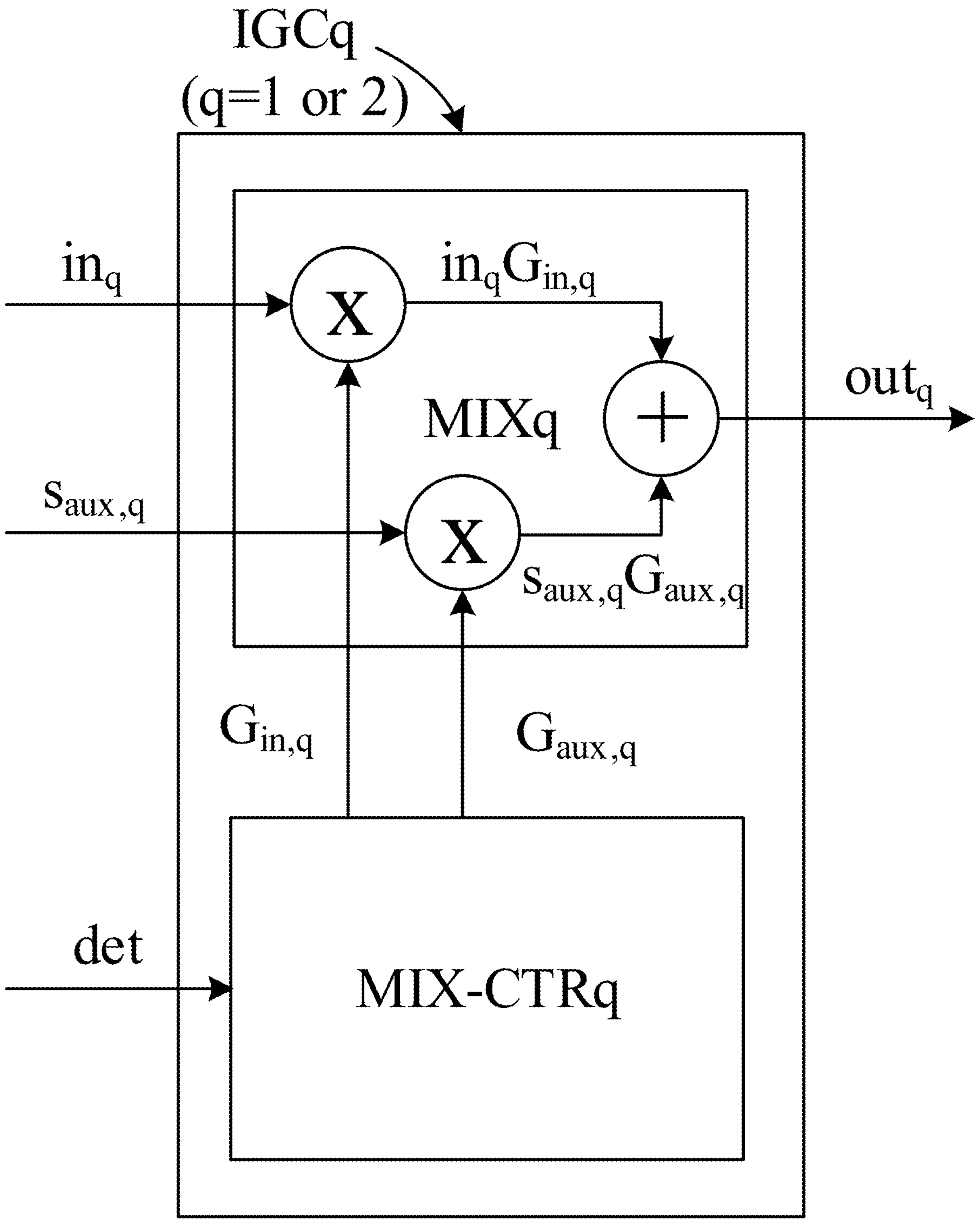
FIG. 7F shows an embodiment of an input gain controller for a binaural hearing system according to the present disclosure.
Figure 7G:
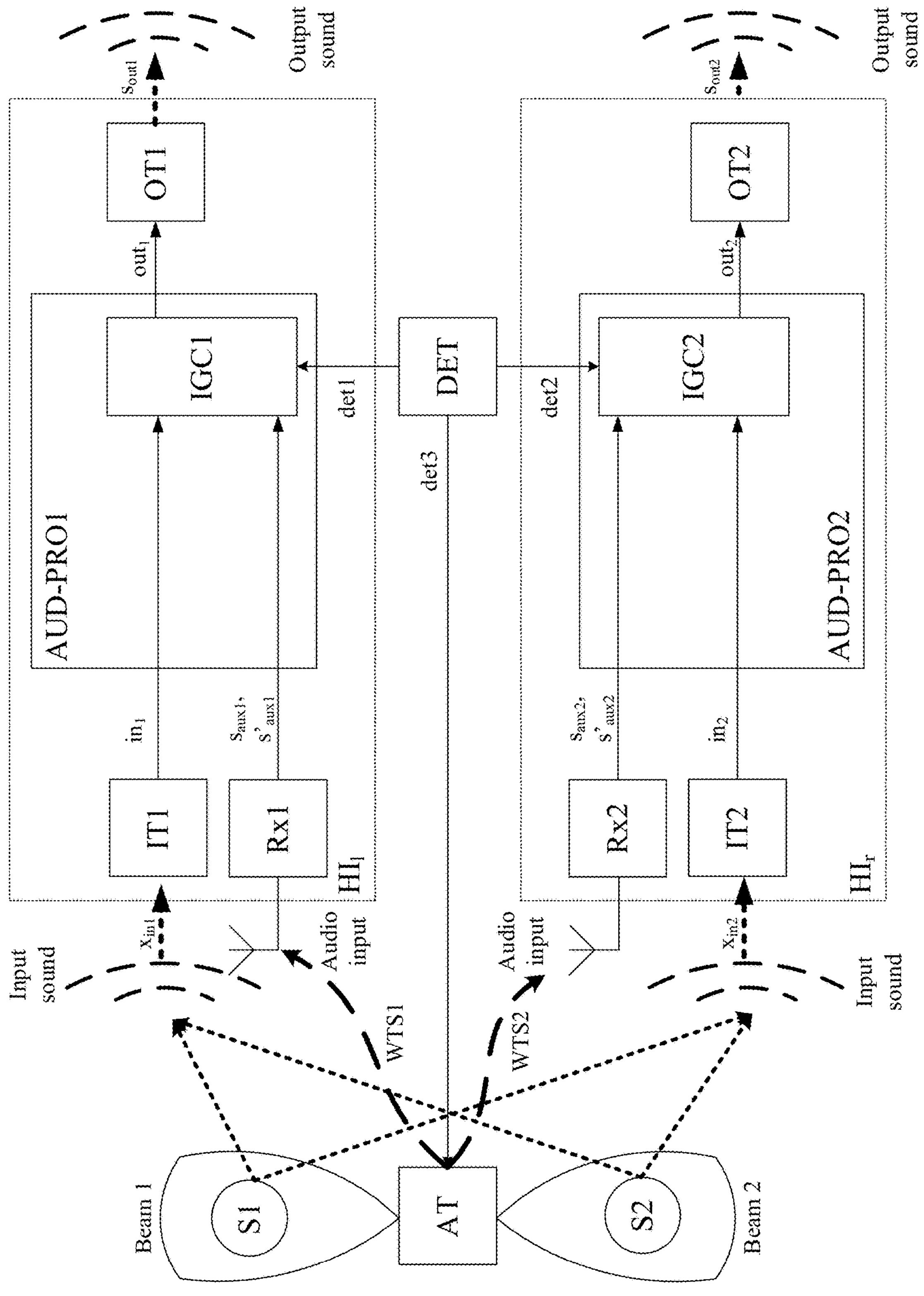
FIG. 7G shows a fifth embodiment of a binaural hearing system according to the present disclosure.
Figure 7H:
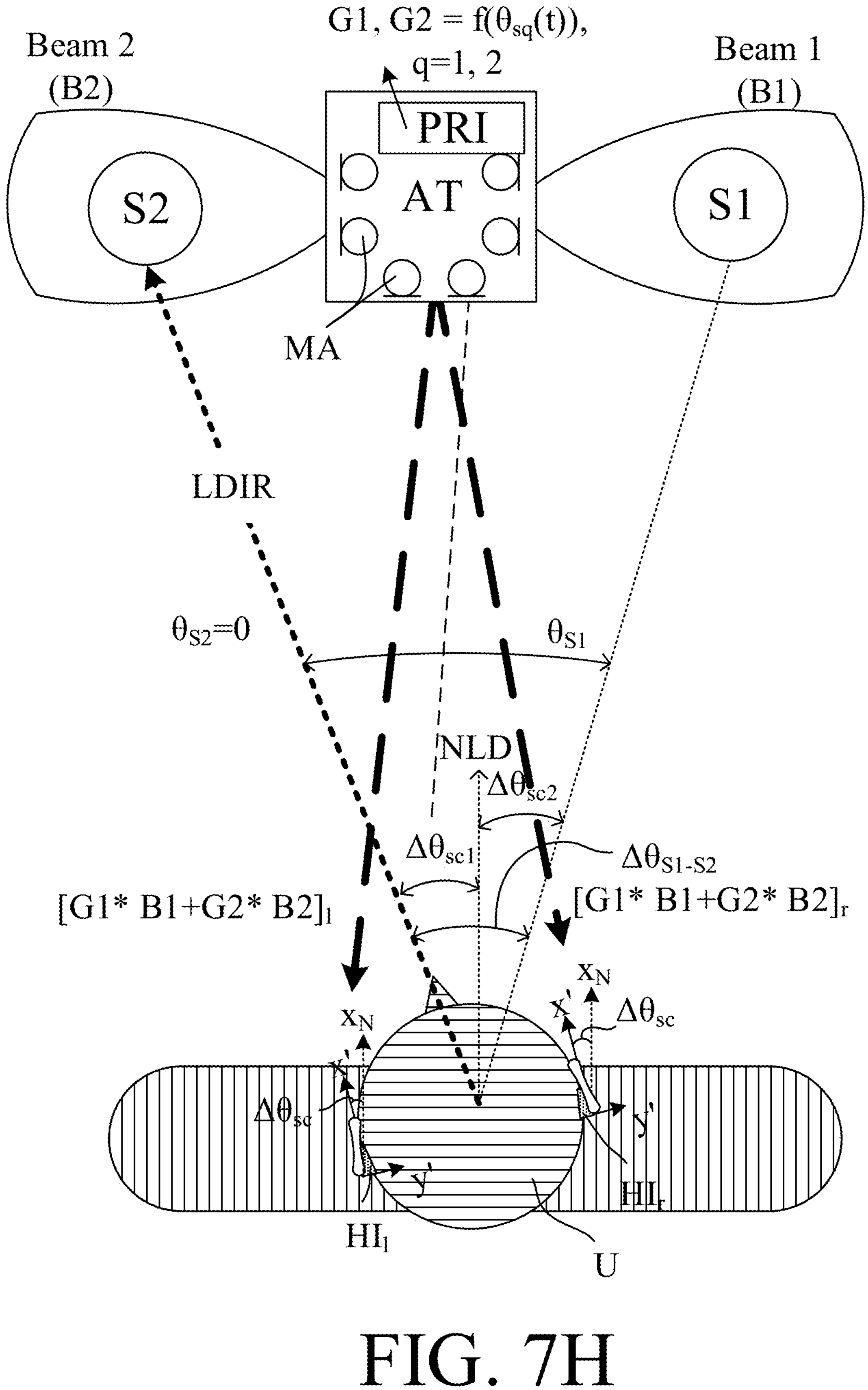
FIG. 7H shows an exemplary configuration of a binaural hearing system according to the present disclosure, where more than one target sound source is present, FIG. 8A schematically illustrates a definition of yaw, pitch and roll axis of a moving object.

The levels of the first and second binaurally processed electric output signals ($s_{aux,b1}$, $s_{aux,b2}$) may be modified in dependence of a difference between a current look direction (LDIR) and a direction (D) to the position of the target sound source (S, cf. e.g. angle $\theta_{sq}$ in FIG. 7H, or angle θ in FIG. 8B). The levels of the first and second binaurally processed electric output signals ($s_{aux,b1}$, $s_{aux,b2}$) may be provided in dependence of the look direction control signal (LDCS=θ) indicative of a current look direction (LDIR) of the user (U) relative to a direction (D) to the position of the target sound source. The modification of the levels may be dependent on the reception control signal (RCS) indicating whether the at least one streamed audio input signal ($s_{aux}$) is currently being received. The levels may be increased the smaller the difference between the current look direction and the direction to the position of the target sound source and decreased the larger the difference between the current look direction and the direction to the position of the target sound source. The levels may e.g. be modified within a range, e.g. between a maximum and a minimum level modification, e.g. limited to 6 dB.

The levels of said first and second binaurally processed electric output signals ($s_{aux,b1}$, $s_{aux,b2}$) may be modified in dependence of a current distance (D) between said target sound source (S) and the user's head (U). The levels may be increased or decreased, the smaller or larger, respectively, the distance (D) between the target sound source (S) and the user's head (U). The levels of the first and second binaurally processed electric output signals may be modified in dependence of the distance control signal (DE) indicative of a current distance (D) between the target sound source (S) and the user's head (U). The modification of the levels may further be dependent on the reception control signal (RCS) indicating whether the at least one streamed audio input signal ($s_{aux}$) is currently being received. The modification of the levels may further be dependent on the look direction control signal (LDCS=θ) being indicative of the current look direction (LDIR) being equal to or within a certain distance (e.g. angle Δθ, e.g. +/−5°) of the direction (D) to the position of the target sound source (S).

The modification of the levels may further, or alternatively, be dependent on a voice control signal from a voice activity detector indicating the presence of a voice (e.g. the user's voice, or any voice) in the first and second electric sound input signals ($x_1$, $x_2$).

The modification of the levels may further, or alternatively, be dependent on a movement control signal from a movement detector indicating whether or not the user is moving.

The binaural hearing aid system may comprise a separate processing device comprising the binaural audio signal processor (AUD-PRO) and/or the at least one wireless receiver (Rx).

Each of the first and second earpieces (EP1, EP2) may comprise a wireless transceiver adapted for exchanging data, e.g. audio or other data, with the separate processing device (and/or directly between each other).

The binaural audio signal processor (AUD-PRO) may form part of one or both of the first and second earpieces (EP1, EP2) (cf. e.g. FIG. 7D) or be located (e.g. mainly, e.g. apart from a selector or mixer of two audio signals located in the respective earpieces, see e.g. units SEL-MIX1, SEL-MIX2 in FIG. 7B)) in a separate processing device in communication with the first and second earpieces (EP1, EP2) (in which case appropriate transmitter and receiver circuitry for transmitting and receiving the binaurally processed electric output signals (($out_1$, $out_2$) in FIG. 7A or ($s_{aux,b1}$, $s_{aux,b2}$) in FIG. 7B) may be included in the separate processing device and the first and second earpieces, respectively).

FIG. 7D shows a third embodiment of a binaural hearing system (e.g. a binaural hearing aid system) according to the present disclosure. The embodiment of a binaural hearing aid system of FIG. 7D is similar to the embodiment of FIG. 7B, but the embodiment of FIG. 7D further comprises respective monaural audio signal processors (M-PRO1, M-PRO2). Each of the first and second monaural audio signal processors are configured to apply one or more processing algorithms to the signals ($sm_1$, $sm_2$) provided by the respective first and second selector/mixer units (SEL-MIX1, SEL-MIX2), e.g. to compensate for a hearing impairment of the user (at the respective first and second ears). In other words, the first and second monaural audio signal processors (M-PRO1, M-PRO2) are configured to apply one or more processing algorithms to A) the first and second electric sound input signals ($x_1$, $x_2$) (or to signals originating therefrom), or B) to binaurally processed versions ($s_{aux,b1}$, $s_{aux,b2}$)) of the streamed audio input signal ($s_{aux}$), or C) to a mixture thereof ($sm_1$, $sm_2$) (when in 'mixing mode').

The first and second monaural audio signal processors (M-PRO1, M-PRO2) may, as shown in the embodiment of FIG. 7D, form part of the binaural audio signal processor (AUD-PRO). In the embodiment of FIG. 7D, the first and second monaural audio signal processors (M-PRO1, M-PRO2) are located after (downstream of) the first and second selector/mixer units (SEL-MIX1, SEL-MIX2), respectively. They may, however, be located elsewhere in the forward path, e.g. before the respective selector/mixer units (in which case any hearing loss compensation should be applied to the streamed audio input signal ($s_{aux}$) in the binaural controller (B-CTR). If the monaural audio signal processors are located before the selector/mixer units, the binaural audio signal processor may be configured to provide binaural gains adapted to modify monaural gains provided by the first and second monaural processors for the first and second electric sound input signals and or the streamed audio input signal(s), or to a signal or signals originating therefrom (e.g. a mixture). The binaural gains may e.g. be constituted by or comprise gains that provide the spatial sense of origin of the target sound source in the first and second binaurally processed electric output signals.

The first and second monaural audio signal processors (M-PRO1, M-PRO2) may be configured to estimate a direction of arrival (DOA) of sound from the target sound source (S) independently. In other words, DOA1 is determined in M-PRO1 (e.g. in EP1) in dependence of $s_{aux}$ and $in_1$, and DOA2 is determined in M-PRO2 (e.g. in EP2) in dependence of $s_{aux}$ and $in_2$. The direction of arrival of sound from the target sound source may be equal to the angle of the direction to the target sound source relative to a normal forward-looking direction of a user, cf. e.g. FIG. 8A, 8B. A logic combination of the respective 'local' DOAs may be determined and used for estimating appropriate spatial cues (e.g. head-related transfer functions) to be applied to the signals presented to the user at the left and right dears of the user.

The target sound source (S) may e.g. be sound from a television (TV) transmitted to the binaural hearing aid system via a TV-sound transmitter (ED) located together with the TV (see e.g. FIG. 2A-2C, and FIG. 3A-3C) and/or a sound from one or more person(s) transmitted to the binaural hearing aid system via a microphone unit (PMA, PMB) located at the person or persons (A, B) in question (see e.g. FIG. 4A, 4B) or sound from a microphone unit (comprising a microphone array and a beamformer) picking up sound from several sound sources around the microphone unit and transmitting the resulting sound signal to the binaural hearing aid system (cf. e.g. FIG. 5 and FIG. 7G, 7H).

FIG. 7E shows a fourth embodiment of a binaural hearing system according to the present disclosure. The binaural hearing aid system comprises first and second hearing aids ($HI_l$, $HI_r$) adapted for being located at or in left and right ears, respectively, of a user. Each of the first and second hearing aids comprises an input transducer (IT1; IT2) for converting an acoustically propagated signal ($x_{in1}$; $x_{in2}$) impinging on the input transducer to an electric sound input signal ($in_1$; $in_2$) comprising a target signal from at least one target sound source (S) and other signals from possible other sound sources (NL, ND) in an environment around the user. Each of the first and second hearing aids further comprises a wireless receiver (Rx1; Rx2) for receiving a wirelessly transmitted signal from an audio transmitter (AT) and for retrieving therefrom a streamed audio input signal ($s_{aux1}$;

$s_{aux2}$) comprising said target signal and optionally other signals from other sound sources in the environment around the target sound source (S). Each of the first and second hearing aids further comprises an input gain controller (IGC1; IGC2) for controlling a relative weight between said electric sound input signal ($in_1$; $in_2$) and said streamed audio input signal ($s_{aux1}$; $s_{aux2}$) and providing a weighted sum ($out_1$, $out_2$) of said input signals. Each of the first and second hearing aids further comprises an output transducer (OT1; OT2) configured to convert said weighted sum ($out_1$, $out_2$) of said input signals, or a further processed version thereof, to stimuli perceivable as sound by the user.

The binaural hearing aid system further comprises a position detector (DET) configured to provide an estimate of a current position of the at least one target sound source (S) relative to the user's head and to provide a position detector control signal (det) indicative thereof. At least one (e.g. each) of the input gain controllers (IGC1; IGC2) of the first and second hearing aids ($HI_l$, $HI_r$) is configured to provide the relative weight between said electric sound input signal ($in_1$; $in_2$) and said streamed audio input signal ($s_{aux1}$; $s_{aux2}$) in dependence of the position detector control signal (det).

The first and second hearing aids ($HI_l$, $HI_r$) may comprise first and second earpieces (EP1, EP2 as in FIG. 7A, 7B, 7D) forming part of or constituting the first and second hearing aids, respectively. The earpieces may be adapted to be located in an ear of the user, e.g. at least partially in an ear canal of the user, e.g. partially outside the ear canal (e.g. partially in concha) and partially in the ear canal.

FIG. 7F shows an embodiment of an input gain controller (IGCq, q=1, 2) for a binaural hearing system according to the present disclosure. Each of the input gain controllers (IGC1; IGC2) of the first and second hearing aids ($HI_l$, $HI_r$) comprises a gain estimator for controlling a relative weight ($G_{m,q}$, $G_{aux,q}$) between the electric sound input signal ($in_1$; $in_2$) and the streamed audio input signal ($s_{aux1}$; $s_{aux2}$) in dependence of the detector control signal (det) and providing a weighted sum ($out_1$, $out_2$) of the input signals. Each of the input gain controllers (IGC1; IGC2) further comprises first and second combination units (here multiplication units 'X') for applying the relative weights ($G_{m,q}$, $G_{aux,q}$, q=1, 2) to the respective input signals ($in_q$; $s_{aux,q}$, q=1, 2) to provide respective weighted signals ($G_{m,q} \cdot in_q$ and $G_{aux,q} \cdot s_{aux,q}$, q=1, 2). Each of the input gain controllers (IGC1; IGC2) further comprises a combination unit (here a summation unit '+') for providing the weighted sum of the ($out_q$, q=1, 2) of the input signals. In other words, the first and second input gain controllers (IGC1; IGC2) provides as output, the weighted sum of the input signals where the weights ($G_{m,q}$, $G_{aux,q}$) are determined based on the detector control signals (det), e.g. the position detector control signal, i.e.

$$out_1 = G_{m,1} \cdot in_1$$

and $$G_{aux,1} \cdot s_{aux,1},$$

$$out_2 = G_{m,2} \cdot in_2$$

and $$G_{aux,2} \cdot s_{aux,2},$$

where the weights may be determined based on an angel of a current look direction of the user with a reference direction and/or an estimated distance between the user and the target sound source.

FIG. 7G shows a fifth embodiment of a binaural hearing system according to the present disclosure. The embodiment of a binaural hearing aid system of FIG. 7G is similar to the embodiment of FIG. 7E, but the embodiment of the binaural hearing aid system of FIG. 7G comprises a 'back-link' from the binaural hearing aid system to the audio transmitter (AT). The binaural hearing aid system comprises a wireless transmitter for transmitting data to the audio transmitter (AT). The binaural hearing aid system is configured to transmit the detector control signal (det3), e.g. the position detector control signal, to the audio transmitter. The audio transmitter may comprise a transmit processor (cf. e.g. 'PRI' in FIG. 7H) configured to determine and to apply a transmitter gain to an electric input signal representing sound (e.g. from a microphone or a microphone array, e.g. a beamformed signal) in dependence of the position detector control signal before said signal is transmitted to the binaural hearing aid system. Thereby, the audio transmitter may be configured to a) provide a prioritization between several target sound sources (e.g. S1, S2 in FIG. 7G), e.g. provided by different directional beams (Beam 1, Beam 2 in FIG. 7G) of a microphone array, e.g. a table microphone unit, cf. e.g. FIG. 7H), and/or b) to apply directional cues to the electric input signal(s) before they are transmitted to the first and second hearing aids of the binaural hearing aid system.

A further prioritization between the electric sound input signal ($in_1$; $in_2$) picked up by the respective input transducers (IT1, IT2) of the first and second hearing aids ($HI_l$, $HI_r$) and the streamed audio input signal ($s_{aux1}$; $s_{aux2}$) in dependence of the detector control signal (det; det1, det2) may be provided by respective input gain controllers (IGC1, IGC2) of the first and second hearing aids ($HI_l$, $HI_r$), e.g. as respective weighted sums ($out_1$, $out_2$) of the input signals ($in_1$, $s_{aux1}$) and ($in_2$, $s_{aux2}$), respectively.

FIG. 7H shows an exemplary configuration of a binaural hearing system according to the present disclosure, where more than one target sound source (S1, S2) is present. FIG. 7H illustrates a scenario using the binaural hearing system illustrated in FIG. 7G, but where the geometrical relation between the user's head and the first and second target sound sources (S1, S2) is described. The geometrical 'terminology' (based on polar coordinates, having a centre of the coordinate system in the head of the user) of FIG. 8B is used in FIG. 7H. The audio transmitter (AT) comprises a microphone unit, e.g. a table microphone (or speakerphone) comprising a microphone array (MA) and a beamformer filter configured to focus its sensitivity (a beam) in a number of (fixed or adaptively determined) different directions around the microphone unit (AT). Thereby, a multitude of sound sources can be individually picked up and transmitted to the binaural hearing aid system, either individually or as one streamed signal, e.g. providing a combination of the individual signals representing different sound sources. The combination may e.g. be a weighted sum of the individual signals as indicated above (with reference to FIG. 7F, 7G) for two sound sources.

In the context of FIG. 7H, the estimate of the current position of the at least one target sound source relative to the user's head comprises an estimate of an angle ($\theta_{S1}$, $\theta_{S2}$, cf. $\theta_{Sq}$, q=1, 2) between the current look direction (LDIR) of the user, and a direction from the user's head to the at least one target sound source (S1, S2), cf. dotted lines from the user's head to the respective sound sources (S1, S2) in FIG. 7H. The look direction and the directions to the target sound sources may be expressed as an angle relative to a reference direction, e.g. a normal look direction (NLD) of the user. In that framework, the current look direction of the user (in FIG. 7H) may be represented by ($-\Delta\theta_{sc1}$), the direction to target sound source S1 may (also) be represented by ($-\Delta\theta_{sc1}$), and the direction to target sound source S2 may be represented by ($\Delta\theta_{sc2}$). The difference between the directions from the user's head to the first and second target sound sources (S1, S2) may be expressed as $\Delta\theta_{S1-S2}=\Delta\theta_{sc2}-(-\Delta\theta_{sc1})=\Delta\theta_{sc2}+\Delta\theta_{sc1}$. In the context of FIG. 7H (assumed to be at time t1), the angle estimating the position of the target sound sources (at time t1) S1 and S2 are $\theta_{S1}$, =0 and $\theta_{S2}=\Delta\theta_{sc2}+\Delta\theta_{sc1}$, respectively.

Thereby a priority (reflected by gains G1, G2=f($\theta_{Sq}$(t), q=1, 2, t indicating a time variance of $\theta_{Sq}$) between two (or more) sound sources is implemented in the audio transmitter (e.g. constituting or forming part of a microphone unit, e.g. a table microphone unit (e.g. a 'speakerphone)'). The direction to a given target sound source may be compared to a current look direction of a user to thereby evaluate a current interest of the user in said target sound source. In a typical scenario, the user looks at the target sound source of current interest to the user by orienting the head in the direction of the target sound source, e.g. either by turning the head alone, or by including the torso, so that the current look direction is equal to the direction from the user to the target sound source of interest. In other words, the angle between the direction to the target sound source and the current look direction is zero (or close to 0). A top priority should hence be associated with a minimum angle between to the current look direction and the target sound source of current interest. An algorithm providing a maximum gain to the signal transmitted to the binaural hearing aid system sound source associated with a minimum angle and a minimum gain to all other target sound sources provided by the audio transmitter (AT) may e.g. be implemented.

The binaural hearing aid system may comprise a motion sensor providing a motion control signal indicative of a user's current motion. The binaural hearing aid system may be configured to track the position of the user relative to the audio transmitter (AT) providing the target signal ($s_{aux}$) and to provide the spatial sense of origin of the target sound source external to said user's head by applying head-related transfer functions to the first and second binaurally processed electric output signals. The head-related transfer functions (HRTF) may be approximated by the level difference between the two ears. The head-related transfer functions may be approximated by the latency difference between the two ears. The head-related transfer functions may be represented by frequency dependent level and latency differences between the two ears. In case of more than one audio signal is received by the binaural hearing aid system from respective more than one audio transmitters, relevant HRTFs for each of the positions of the more than one audio transmitters may be applied to the corresponding more than one audio signal before being presented to the user. Thereby a spatial sense of origin external to the user's head of the one or more target sound sources corresponding to the sound provided by the more than one audio transmitters to the binaural hearing aid system may be provided.

The binaural hearing aid system may comprise first and second hearing aids. The first and second hearing aids may comprise the first and second earpieces (EP1, EP2), respectively. The first and second hearing aids may be constituted by or comprise air-conduction type hearing aids, bone-conduction type hearing aids, cochlear implant type hearing aids, or a combination thereof.

According to the present disclosure, it is possible to place a streamed sound signal at a desired angle in space. E.g. if a user is having a phone conference with two speakers, the one speaker can be (perceptually) placed at −45 degrees in the horizontal space, and the other speaker at +45 degrees (cf. e.g. FIG. 4A, 4B), simply by applying the appropriate (time domain) Head-Related Impulse Response, HRIR, to each streamed speaker and each ear side (e.g. to the left and right (e.g. first and second) binaurally processed electric output signals ($Signal_{L-ear}$, $Signal_{R-ear}$ in the expressions below) thereby providing a spatial sense of origin of the target sound source(s) external to the user's head.

$$\mathrm{Signal}_{L-ear}(t) = HRIR_{L,-45^\circ} * \mathrm{Signal}_{Spkr1}(t) + HRIR_{L,+45^\circ} * \mathrm{Signal}_{Spkr2}(t)$$

$$\mathrm{Signal}_{R-ear}(t) = HRIR_{L,-45^\circ} * \mathrm{Signal}_{Spkr1}(t) + HRIR_{R,+45^\circ} * \mathrm{Signal}_{Spkr2}(t)$$

where 't' represents time, "HRIR*Signal" represents the convolution of the impulse responses 'HRIR' and the 'Signal'. Likewise, to obtain the same effect, the corresponding transfer functions 'HRTF' can be multiplied with the 'Signal' in the (time-)frequency domain (k,m) (where k and m are frequency and time indices, respectively). $Signal_{Spkr1}$ and $Signal_{Spkr2}$ represent the wirelessly received 'at least one streamed audio input signals' from the respective transmitters (of the (here) two speakers (of the phone conference)).

The offset (or reference direction) of the head orientation can either be:

- Relative to the external streaming device (e.g. a partner microphone, a table microphone, a TV-adapter, a telephone, etc.)
- The direction to the external streaming device when the streamed signal is initiated.
- Reset to the "average" direction for the last X period of time (where e.g. X≤20 sec).

The HRTF and/or HRIR function can be selected from a predefined set of transfer functions (HRTF) and/or impulse responses (HRIR) stored in a lookup table depending on input angle, frequency and distance. Alternatively, the binaural signals can be calculated with a parametric model, that includes level and latency difference between the two ears as a function of angle, frequency and distance. A parametric model may be easier to implement in a hearing aid system with limited memory and processing power. An example of such a system may be formulated as $$\mathrm{Signal}_{L-ear}(t) = G_{L,angle} \times \mathrm{Signal}(t+\tau_{L,angle})$$

$$\mathrm{Signal}_{R-ear}(t) = G_{R,angle} \times \mathrm{Signal}(t+\tau_{R,angle})$$

where x represents multiplication, and Signal($t+\tau_{L,angle}$) and Signal($t+\tau_{R,angle}$) are the (model) wirelessly received signals from a given target sound source at time t plus the (acoustic) delay τ appropriate for the angle θ at the left and right ears (see e.g. FIG. 8B). The (coefficients $G_{L,\ angle}$ ($G_L(\theta)$) and $G_{R,\ angle}$ ($G_R(\theta)$)) is the gain/level to be applied to the left and right channel of the streaming signal based on the estimated/desired angle of the signal relative to the head position of the hearing aid user (cf. e.g. FIG. 8B, angle θ ($\theta_{sl}$, $\theta_{sr}$)). The binaurally processed electric output signals ($Signal_{L-ear}$, $Signal_{R-ear}$) may thus be determined using predefined or adaptively determined head-related transfer functions (or gains $G_L$, $G_R$) based on information of the current angle θ between the direction of the target sound source being streamed to the binaural hearing aid system and the normal forward looking direction of the user (cf. FIG. 8A, 8B), e.g. compensated for a head rotation and/or an eye gaze angle deviating from zero.

Figure 10:
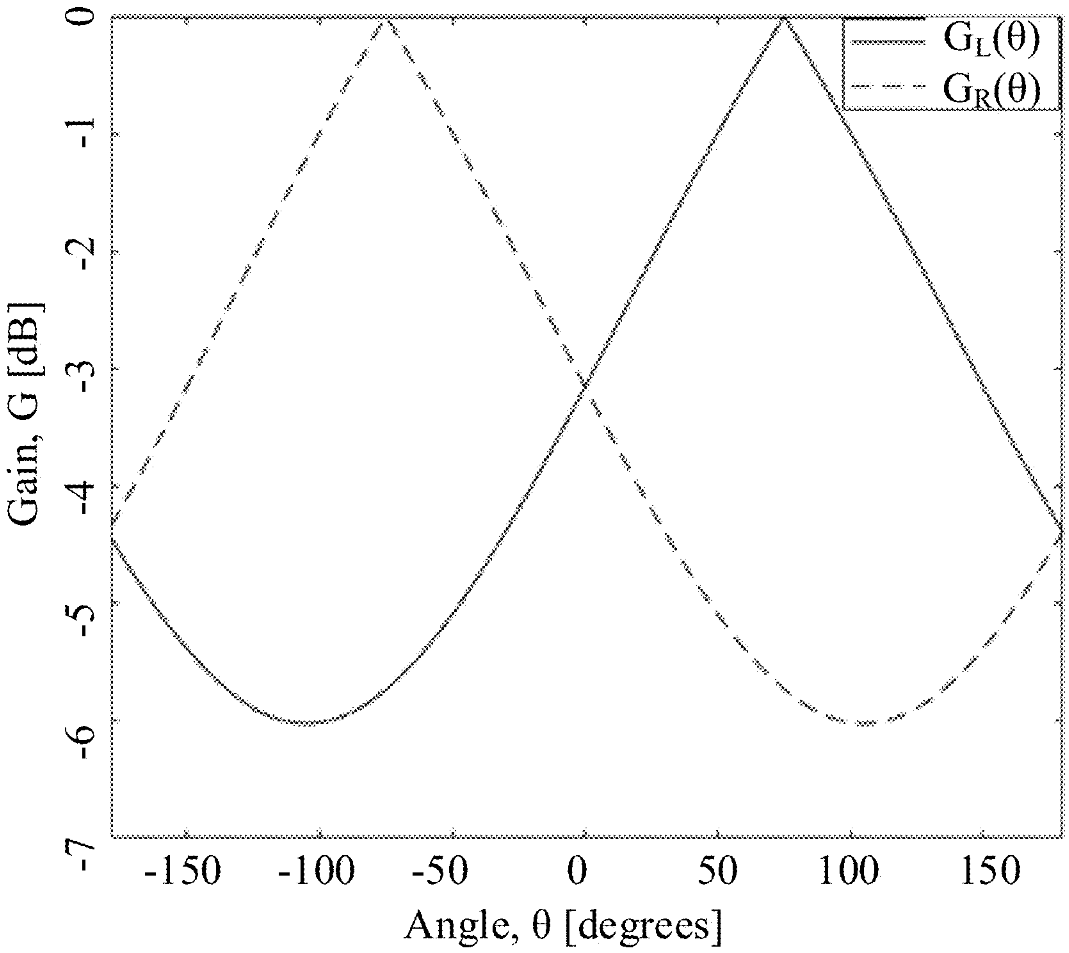
FIG. 10 shows an example of how the gain applied to the left and right channels from a streaming source may be configured in order to achieve a spatialization effect as a function of angle (θ) in a binaural hearing system according to the present disclosure.

FIG. 10 shows an example of how the gain ($G_L$, $G_R$) applied to the left and right channel from the streaming source may be configured in order to achieve a spatialization effect as a function of angle (θ). Here angle "0" represents the reference or desired angle of the streaming source relative to the head angle of the user. In order to change the perceived location of the streaming source, the gain curves for the left and right can be shifted along this axis.

Likewise, the coefficients $\tau_{L,\ angle}$ ($=\tau_L(\theta)$) and $\tau_{R,\ angle}$ ($=\tau_R(\theta)$) is the delay difference to be applied to the left and right channel of the streaming signal based on the estimated/desired angle of the signal relative to the head position of the hearing aid user.

Figure 11:
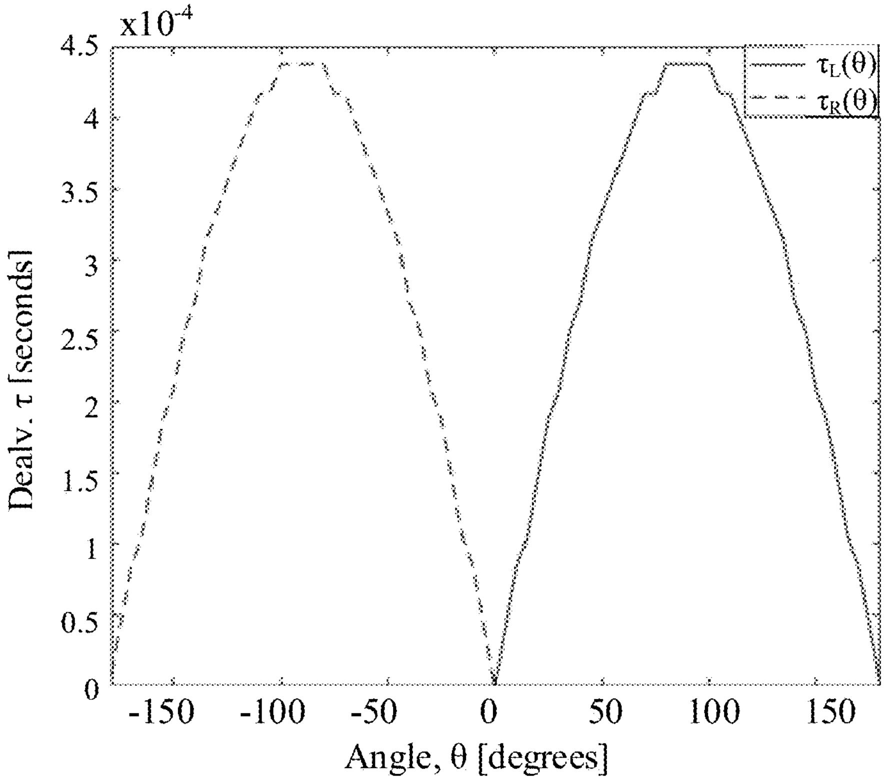
FIG. 11 shows an example of how the delay ($\tau_L(\theta)$ solid graph, $\tau_R(\theta)$ dashed graph) (applied to the left and right channels from the streaming source) may be configured in order to achieve a spatialization effect as a function of angle (θ) in a binaural hearing system according to the present disclosure.

FIG. 11 shows an example of how the delay ($\tau_L(\theta)$ solid graph, $\tau_R(\theta)$ dashed graph) (applied to the left and right channel from the streaming source could be configured in order to achieve a spatialization effect as a function of angle (θ). Here angle "0" represents the reference or desired angle of the streaming source relative to the head angle of the user. In order to change the perceived location of the streaming source, the gain curves for the left and right can be shifted along this axis.

This solution ensures low implementation complexity, processing power and memory cost by applying broadband signal gain and delay differences whilst providing some level of spatial orientation perception. Spatial depth perception can be added by inclusion of a distance-based modification (attenuation) to the coefficient values, and room acoustics can also be added by reverberance based modifications.

Solution complexity and perception of target sources may also be enhanced by adding spectral/frequency-based modifications to the gain and delay changes between the right and left ear. A way to achieve this is to expand each coefficient to a vectorized set of values at a discrete number of frequencies providing frequency-based variations in the gain and delay difference between left and right ear. Another way to achieve this could be to apply head-related impulse responses to the left and right signal at a discrete number of angles, as formulated below.

$$\text{Signal}_{L-ear}(t) = G_{L,\,angle} + \text{Signal}(t + \tau_{L,\,angle})$$

$$\text{Signal}_{R-ear}(t) = G_{R,\,angle} + \text{Signal}(t + \tau_{R,\,angle})$$

The head-related impulse responses (HRIR) provide the appropriate spatial sensation for the user, and the gains, $G_L$ and $G_R$, are the additionally applied gain in order to better hear the desired source. (Usually the source is in front of the user). This enables the system to attenuate other sound sources in the space without removing them completely and maintaining their position in space.

If the streamed sound includes multiple target sources or speakers which should be separated, this can be done by addition of each target source to the signal to left and right ear with individual reference angle input to the gain and delay coefficients as well as the HRIR.

In a specific example, it is proposed to apply additional gain to the streamed sound and/or the hearing aid output dependent of the user head orientation. A simple implementation of this may be to have full streaming gain, (e.g. gain=1 (0 dB)), when the users head is pointing in the direction of the desired source, +/−30°, and to successively reduce the gain at larger deviations in angle (e.g. −3 dB at +/−45°, e.g. −6 dB at +/−60°, e.g. −12 dB at +/−90°, and up to −18 dB at more than +/−90° angles. Alternatively, the implementation may be a more continuously dependence of angle. An example of this is illustrated in FIG. 2A, 2B, 2C, where the user can experience spatial sound from the TV-audio delivery device (ED in FIGS. 2A-2C and 3A-3C). While the user is facing the TV (FIG. 2A), then the additional gain on streamed TV sound is at full 0 dB. At the same time, the gain on the amplified sound from the internal Hearing Aid microphones is reduced (e.g. by −6 dB to −12 dB), in order for the user to better focus on the TV sound. If the user then wants to talk to a person next to him/her (FIG. 2B, 2C), then the streamed TV-sound is reduced (e.g. by −12 dB) when the user is turning the head away from the TV, and the amplified sound from the hearing aid microphones is turned up (e.g. to 0 dB), so the user can better hear the person he/she is talking to.

This system can be described as an attention-based gain control system where the signal of interest, either the streamed signal or the hearing aid output is amplified whilst the other is attenuated, in order to achieve optimal listening conditions based on intend. This can be exemplified by adding a coefficient for overall gain which is applied to both the right and left channel of the streamed sound source as well as the hearing aid, HI, output. This can be exemplified by addition of the HI output (based on the microphone signals) to the streamed signal source shown in the equations above, renamed to $\text{Signal}_{L,\ Stream}$ and $\text{Signal}_{R,\ Stream}$ in the formulation below.

$$\text{Signal}_{L-ear}(t) = \text{Signal}_{L,Stream}(t) \times G_{Stream,Attention} + HI_{L,\,Output}(t) \times G_{HI,Attention}$$

$$\text{Signal}_{R-ear}(t) = \text{Signal}_{R,Stream}(t) \times G_{Stream,Attention} + HI_{R,\,Output}(t) \times G_{HI,Attention}$$

The coefficients $G_{Stream,\ Attention}$ and $G_{HI,\ Attention}$ are the gain/level to be applied to the streamed audio signal and HI output signal based on the attention/engagement of hearing aid user estimated by angle of streaming source relative to the head position of the hearing aid user.

Figure 12:
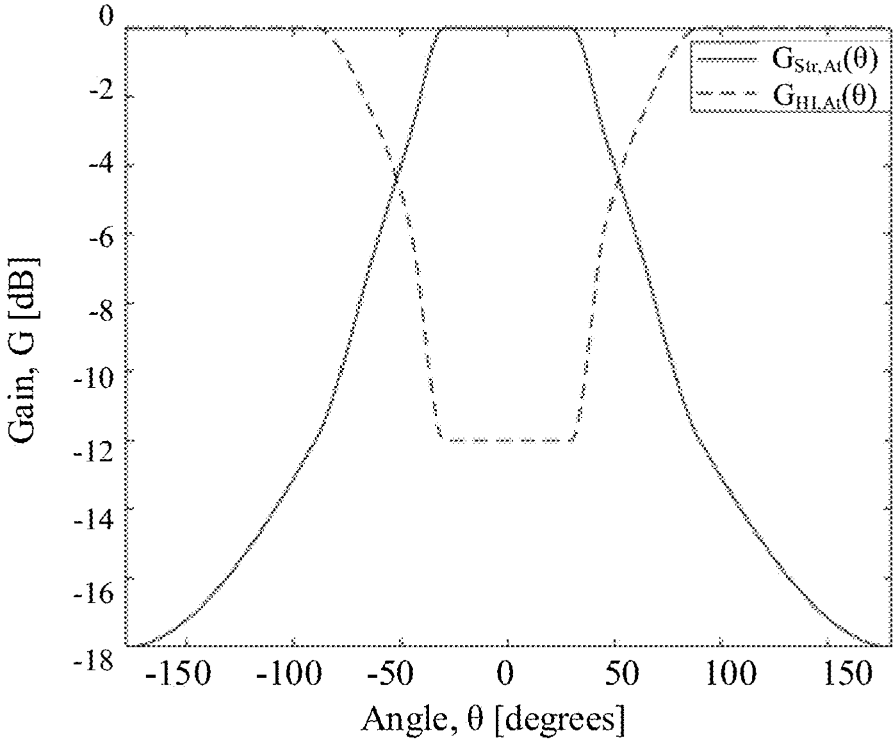
FIG. 12 shows an example of how the gain applied to the streamed signal and the gain applied to the individual hearing aid output signals may be configured in order to achieve an attention-based target steering effect as a function of angle (θ) in a binaural hearing system according to the present disclosure.

FIG. 12 shows an example of how the gain ($G_{Stream,Attention}=G_{S,A}$) applied to the streamed signal ($\text{Signal}_{L,Stream}$, $\text{Signal}_{R,Stream}$) and the gain ($G_{HI,Attention}=G_{HI,A}$) applied to the HI output signal ($HI_{L,Output}$, $HI_{R,Output}$) may be configured in order to achieve an attention-based target steering effect as a function of angle (θ). Here angle "0" represents the reference or desired angle of the streaming source relative to the head angle of the user. An advantage of providing two separate streamed signals is that it is easier to apply the spatial information to the streamed signal in the transmitter (of the external microphone) and then stream the result in a stereo format, therefore the two streams.

It is further proposed is to track the user's orientation of the head in order to place the streamed sounds in space and keep them in the spatial location when the user turns the head, see e.g. FIG. 1C, FIG. 2C, FIG. 3C, FIG. 4B, FIG. 5, FIG. 6. The orientation of the user's head can e.g. be tracked by using a:

Gyroscope placed in at least one of the hearing aids.

Accelerometers (ideally one in each hearing aid)

Magnetometer (sensing the earth's magnetic field)

Radio connection to external device detecting a direction of arrival (DOA) of target sound and/or time-of-flight (ToF) (e.g. using Bluetooth Low Energy (BLE), or LE Audio or Ultra WideBand (UWB)) for wirelessly received target signals.

A combination of two or more of the above.

Head tracking can be measured by a three axis coordinate system (x, y, z) with origin in the center of the user's head. Rotational force of the head is expressed as the rotation around each of these axes and can be named by the terms yaw, pitch, and roll, as illustrated in the FIG. 8A (cf. e.g. US20150230036A1)

Head tracking using the motion sensing technologies accelerometer, gyroscope and magnetometer can be done in several different ways. Some algorithms include only a single of the above-mentioned motion sensing technologies, while others require multiple. These include but are not limited to:

Direction and magnitude of the gravitational vector.

Integration of angular speed over time.

Absolute orientation given by the earth's magnetic field.

Sensor Fusion algorithms:

- Complimentary filter implementation
- Kalman filter implementation
- Quaternion implementation
- Euler angle implementation
- Mahony filter implementation
- Madgwick filter implementation Machine learning algorithms based on single or combined sensor data. In a hearing aid system with limited power, it may be relevant to use machine learning with a limited number of sensors. Gyroscopes are e.g. rather power hungry.

Complimentary filter implementation example: The complementary filter fuses the accelerometer and integrated gyro data by passing the former through a 1st-order low pass and the latter through a 1st-order high pass filter and adding the outputs. The angular output for each of the three axes can be calculated separately by:

$$\theta_k = \alpha(\theta_{k-1} + \omega_k \Delta t) + (1 - \alpha)a_k$$

where $\theta_k$ is the angle (between x and y, x and z or y and z)>), $\omega_k$ is the high pass filtered gyro data, $a_k$ is the low pass filtered accelerometer data, k is a sample index-index, $\Delta t$ is the time between samples, and the filter scaling factor $\alpha$ can be calculated by:

$$\alpha = \frac{T}{\Delta t} \Big/ \left(1 + \frac{T}{\Delta t}\right)$$

where T determines the filter cut-off frequencies.

Machine learning algorithms: An example of a Neural Network trained to determine the head orientation angle $\theta$ relative to the target direction may comprise Extract data from one or more sensors and use the extracted parameters as inputs and determine the angle $\theta$ as an output using a pretrained Neural Network. A gyroscope is the optimal sensor for detecting head orientation but is also very power hungry for a hearing system. Accelerometers are really good at detecting the gravitational pull, but not good at detecting head orientation in the horizontal plane. Here machine learning may help to extract information of the head orientation based on accelerometer data. Combining accelerometer data with magnetometer data, may improve the performance of a machine learning model.

An example for how to train a machine learning model may be to collect data from a prototype set of hearing aids including both gyroscope, accelerometer and/or magnetometer. Based on this, a well-known and commonly used algorithm for orientation estimation, such as the Madgwick filter implementation, can be utilized in order to estimate the "true" orientation and be used as the response/target value when training machine learning models. In order to have a model for head orientation based on accelerometer data, the model may comprise raw measurements from one or more axis of the accelerometer as well as computed values based on features of the data. Examples of feature data include either raw or filtered signal point metrics, signal distance metrics, signal statistics, signal spectrum, and other signal characteristics. Signals can both consist of data from a single axis or by any combination of the 3 available axes. The machine learning model can use the signals and features either sample by sample or in sequences based on the implemented model structure. The model can either be configured as a discrete classification model or a continuous regression model based on solution intent. A specific example may comprise sequential signal data used in a 2 stage Convolution Neural Network (CNN) for discrete classification of angular data.

A choice of which head tracking algorithm to use may be based on the available motion sensing hardware technology in the device used as well as desired implementation complexity and computational load.

A definition of the rotational movement parameters pitch, yaw and roll relative to the x, y and z axis of an orthogonal coordinate system is illustrated in FIG. 8A. Roll is defined as a rotation around the x-axis. Pitch is defined as a rotation around the y-axis. Yaw is defined as a rotation around the z-axis.

Referring to the placement of the orthogonal coordinate system relative to a user's head in FIG. 8A:

Pitch is defined as a rotation of the head around the y-axis (e.g. imposed by nodding (moving the head in the x-z-plane)). Can be measured by either a single or a pair of hearing aid devices. A gyroscope in a hearing aid device can measure it directly. Measurements from a pair of gyroscopes in each their hearing aid device can be averaged to provide higher precision. An accelerometer will measure the direction of the gravity field and the pitch can then be determined by calculation of the difference between the actual directions of the gravity and a previous determined 'normal' direction i.e. the established z-axis. If two hearing aids both estimate pitch, they can combine their results for better precision.

Yaw is defined as a rotation of the head around the z-axis (e.g. imposed by moving the head from side to side in a horizontal (x-y) plane). Can be measured by either a single or a pair of hearing aid devices. A gyroscope in a hearing aid device can measure it directly. Measurements from a pair of gyroscopes, one in each hearing aid device can be compared (e.g. averaged) to provide higher precision. With an accelerometer there are two ways to estimate yaw or more exact angular velocity $\omega$.

Roll is defined as a rotation of the head around the x-axis (e.g. imposed by moving the head from side to side in a vertical (y-z) plane).

FIG. 8B schematically illustrates the position of a target sound source relative to the user. FIG. 8B illustrates a user U equipped with left and right hearing aids ($HI_l$, $HI_r$) and a target sound source (S) (e.g. a loudspeaker, as shown, or a person speaking, or any other (localized) sound source of interest to the user) located in front, to the left of the user. Left and right microphones ($mic_l$, $mic_r$) of the left and right hearing aids receive acoustically propagated sound signals from sound source (S). The sound signals are received by the respective microphones and converted to electric input signals and e.g. provided in a time frequency representation in the form of (complex) digital signals ($X_{sl}[l,k]$ and $X_{sr}[l,k]$) or as time domain signals ($x_1$, $x_2$) in the left and right hearing aids ($HI_l$, $HI_r$), l being a time index and k being a frequency index (e.g. provided by respective time to time-frequency conversion units (e.g. analysis filter banks). The directions of propagation of the sound wave-fronts from the sound source (S) to the respective left and right microphone units ($mic_l$, $mic_r$) are indicated by thin lines (denoted $d_{sl}$ and $d_{sr}$, e.g. representing vectors) from the center (0, 0, 0) of the orthogonal coordinate system (x, y, z) located midway between the left and right hearing aids ($HI_l$, $HI_r$). The microphones and the sound source (S) are assumed to lie in the xy-plane (z=0, φ=90°), which does not need to be the case, though. The different distances ($d_{sl}$, $d_{sr}$) and angles ($\theta_{sl}$, $\theta_{sr}$) from the sound source (S) to the two microphones ($mic_l$, $mic_r$) of the left and right hearing aids, respectively, result in an ITD(D, θ, φ=90°) (ITD=Inter-aural Time Difference). Likewise, the different constitution of the propagation paths from the sound source to the left and right hearing aids gives rise to different levels of the received signals at the two microphones (the path to the right hearing aid ($HI_r$) is influenced by the users' head (as indicated by the dotted line segment of the vector ($d_{sr}$), whereas the path ($d_{sl}$) to the left hearing aid ($HI_l$) is NOT). In other words an ILD(D, θ, φ=90°) is observed (ILD=Inter-aural Level Difference). These differences (that are perceived by a normally hearing person as localization cues) are to a certain extent (depending on the actual location of the microphones on the hearing device) reflected in the microphone input signals ($X_{sl}[m,k]$ and $X_{sr}[m,k]$, or $x_1$ and $x_2$) and can be used to extract the head-related transfer functions and to apply these spatial cues to the wirelessly received signal ($s_{aux}$) to provide a spatial sense or origin to the streamed signal for the given geometrical scenario for a point source located at (D, θ, φ=90°), e.g. represented by the vector D.

Figure 9:
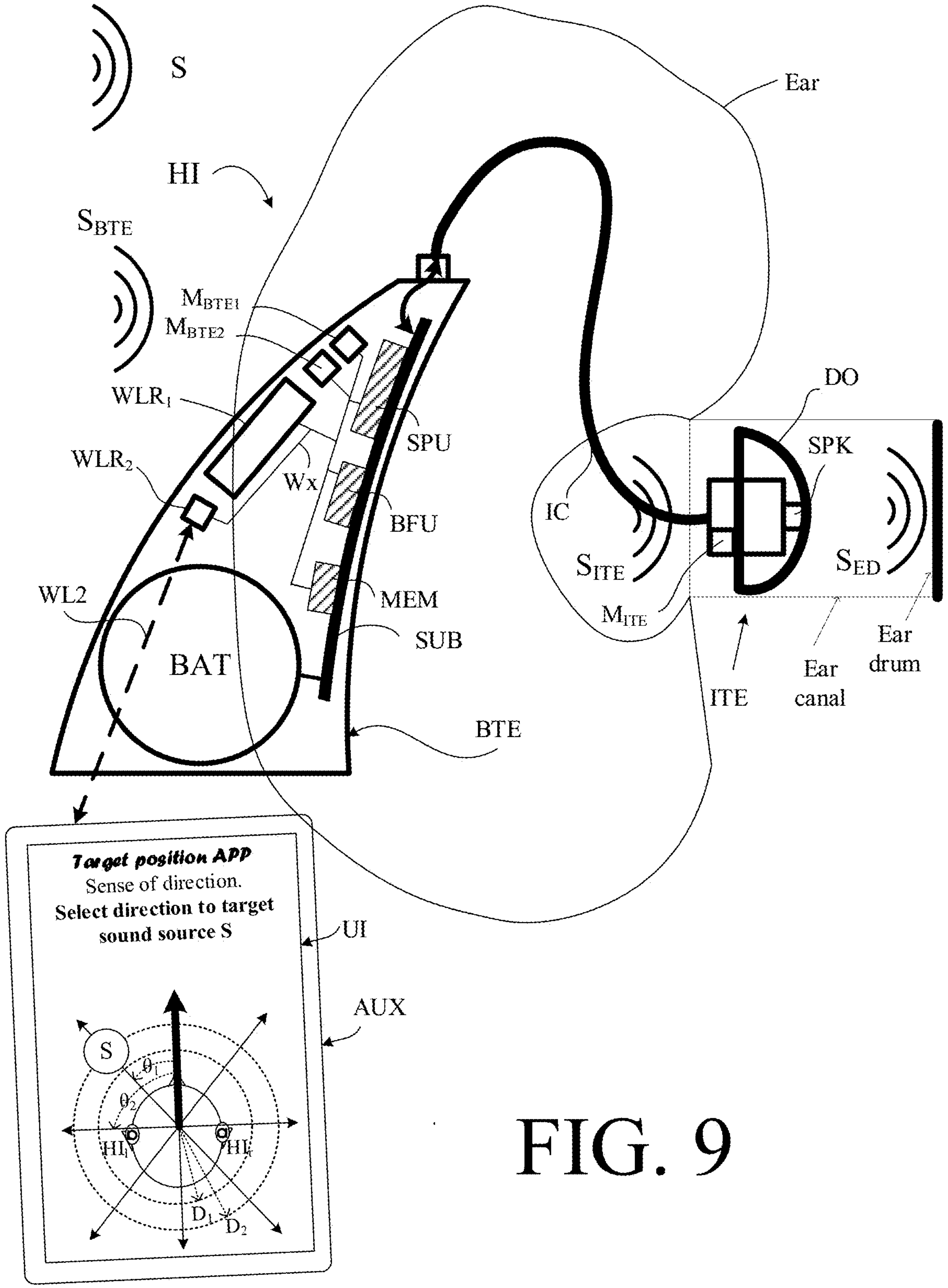
FIG. 9 shows an example of a hearing aid and an auxiliary device implementing a user interface for use in a binaural hearing system according to the present disclosure.

FIG. 9 shows an embodiment of a hearing aid according to the present disclosure comprising a BTE-part located behind an ear or a user and an ITE part located in an ear canal of the user. FIG. 9 illustrates an exemplary hearing aid (HI) formed as a receiver in the ear (RITE) type hearing aid comprising a BTE-part (BTE) adapted for being located behind pinna and a part (ITE) comprising an output transducer (OT, e.g. a loudspeaker/receiver) adapted for being located in an ear canal (Ear canal) of the user (e.g. exemplifying a hearing aid (HI) as shown in FIG. 7A, 7B). The BTE-part (BTE) and the ITE-part (ITE) are connected (e.g. electrically connected) by a connecting element (IC). In the embodiment of a hearing aid of FIG. 9, the BTE part (BTE) comprises two input transducers (here microphones) ($M_{BTE1}$, $M_{BTE2}$) each for providing an electric input audio signal representative of an input sound signal ($S_{BTE}$) from the environment (in the scenario of FIG. 9, from sound source S). The hearing aid of FIG. 9 further comprises two wireless receivers ($WLR_1$, $WLR_2$) for providing respective directly received auxiliary audio and/or information signals. The hearing aid (HI) further comprises a substrate (SUB) whereon a number of electronic components are mounted, functionally partitioned according to the application in question (analogue, digital, passive components, etc.), but including a configurable signal processing unit (SPU), a beamformer filtering unit (BFU), and a memory unit (MEM) coupled to each other and to input and output units via electrical conductors (Wx). The mentioned functional units (as well as other components) may be partitioned in circuits and components according to the application in question (e.g. with a view to size, power consumption, analogue vs digital processing, etc.), e.g. integrated in one or more integrated circuits, or as a combination of one or more integrated circuits and one or more separate electronic components (e.g. inductor, capacitor, etc.). The configurable signal processing unit (SPU) provides an enhanced audio signal (cf. signal OUT in FIG. 7A, 7B), which is intended to be presented to a user. In the embodiment of a hearing aid device in FIG. 9, the ITE part (ITE) comprises an output unit in the form of a loudspeaker (receiver) (SPK) for converting the electric signal (OUT) to an acoustic signal (providing, or contributing to, acoustic signal (SED) at the ear drum (Ear drum). The ITE-part if FIG. 9 further comprises an input unit comprising an input transducer (e.g. a microphone) ($M_{ITE}$) for providing an electric input audio signal representative of an input sound signal ($S_{ITE}$) from the environment at or in the ear canal. In another embodiment, the hearing aid may comprise only the BTE-microphones ($M_{BTE1}$, $M_{BTE2}$). In yet another embodiment, the hearing aid may comprise an input unit located elsewhere than at the ear canal in combination with one or more input units located in the BTE-part and/or the ITE-part. The ITE-part further comprises a guiding element, e.g. a dome, (DO) for guiding and positioning the ITE-part in the ear canal of the user.

The hearing aid (HI) exemplified in FIG. 9 is a portable device and further comprises a battery (BAT) for energizing electronic components of the BTE- and ITE-parts.

The hearing aid (HI) comprises a directional microphone system (beamformer filtering unit (BFU)) adapted to enhance a target acoustic source among a multitude of acoustic sources in the local environment of the user wearing the hearing aid. The directional system may be adapted to detect (such as adaptively detect) from which direction a particular part of the microphone signal (e.g. a target part and/or a noise part) originates and/or to receive inputs from a user interface (UI, e.g. a remote control or a smartphone) regarding the present target direction (cf. auxiliary device (AUX) in the lower part of FIG. 9). The memory unit (MEM) may comprise predefined (or adaptively determined) complex, frequency dependent constants defining predefined or (or adaptively determined) 'fixed' beam patterns according to the present disclosure, together defining a beamformed signal.

The hearing aid of FIG. 9 may constitute or form part of a hearing aid and/or a binaural hearing aid system according to the present disclosure.

The hearing aid (HI) according to the present disclosure may comprise a user interface (UI), e.g. as shown in FIG. 9 implemented in an auxiliary device (AUX), e.g. a remote control, e.g. implemented as an APP in a smartphone or other portable (or stationary) electronic device. In the embodiment of FIG. 9, the screen of the user interface (UI) illustrates a Target position APP. A position (e.g. direction (θ) and distance (D)) to the present target sound source (S) may be selected from the user interface (e.g. from a limited number of predefined options (θ, D), e.g. by dragging the sound source symbol (S) to a currently relevant position (θ', D') relative to the user. The currently selected target position (symbol S) is placed to the left of a reference direction (here the frontal direction relative to the as user's nose, e.g. −45°, at angle $\theta_1$ relative to the reference direction and at distance D2 from the reference point (e.g. the centre) of the head of the user). The reference direction is indicated by the bold arrow starting in the reference point of the user's head. The auxiliary device (AUX) and the hearing aid (HI) are adapted to allow communication of data representative of the currently selected position (if deviating from a predetermined position (already stored in the hearing aid)) to the hearing aid via a, e.g. wireless, communication link (cf. dashed arrow WL2 in FIG. 9). The communication link WL2 may e.g. be based on far field communication, e.g. Bluetooth or Bluetooth Low Energy (e.g. LE Audio, or similar technology), implemented by appropriate antenna and transceiver circuitry in the hearing aid (HI) and the auxiliary device (AUX), indicated by transceiver unit $WLR_2$ in the hearing aid.

A neural network may be used to determine the head orientation of the user of a hearing aid or hearing aid system.

In the following, some combinations of applications of the present concepts in a hearing aid are mentioned:

1. Using spatial audio on streamed sound in a hearing aid system (HI+TV-box, Remote Mic and/or Smartphone)
2. Using spatial audio on integrated microphone sound in a hearing aid system (e.g. augmented hearing)
3. Combining spatial audio with head tracking to present the streamed sound to approach the user externally from a desired direction
4. Using head tracking to control the amplification of streamed sound. (E.g. when users is looking in the direction of the source of the streamed sound, then the streamed sound amplification is increased)
5. Using head tracking to control the amplification of the standard HI amplified sound while streaming. (E.g. when user is looking at the TV/TV-box then the ambient sound amplification is reduced, and when the user looks away from the TV/TV-box then the ambient sound amplification in increased.
6. Using distance approximation measure between connected devices, such as RSSI, to control the amplification or externalization of streamed sound.
7. Achieving head tracking using gyroscope
8. Achieving head tracking using accelerometer
9. Achieving head tracking using magnetometer
10. Achieving head tracking using DOA on wireless signals
11. Achieving head tracking combining two< or more of 7-10 above
12. Use available motion and sound environment data to automatically control the level of spatial audio and mix between streamed sound and integrated microphone sound presented to the user.
13. Setting the offset of the direction of the streamed sound relative to the transmitter, or direction when initiated, or average direction over last X amount of time, or manually/by manual calibration
14. Tracking the position of the user relative to the streaming device and presenting the spatial sound accordingly. Achieving spatial Audio using a simple HRTF only adjusting the level difference between the two ears
15. Achieving spatial Audio using a simple HRTF only adjusting the latency difference between the two ears
16. Achieving spatial Audio using a simple HRTF combing 14+15.
17. Achieving spatial Audio using a simple HRTF with frequency dependent level and latency differences between the two ears.
18. Achieving spatial Audio by any other means differentiated binaural processing between the two ears using proprietary integrated hearing aid features.

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element, but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method are not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more.

REFERENCES

EP3270608A1 (GN Hearing) 17 Jan. 2018
US2013094683A1 (Oticon) 18 Apr. 2013
EP3716642A1 (Oticon) 30 Sep. 2020
EP3013070A2 (Oticon) 27 Apr. 2016
WO2010133246A1 (Oticon) 25 Nov. 2010
US2015003653A1 (Starkey) 1 Jan. 2015
US2013259237A1 (Phonak) 3 Oct. 2013
US2014348331A1 (GN Resound) 27 Nov. 2014
US20150230036A1 (Oticon) 13 Aug. 2015
US2015189449A1 (GN Resound) 2 Jul. 2015
EP3373603A1 (Oticon) 21 Feb. 2018
EP3185590A1 (Oticon) 28 Jun. 2017
EP3285500A1 (Oticon) 21 Feb. 2018
EP3477964A1 (Oticon) 1 May 2019.

The invention claimed is:

1. A binaural hearing aid system comprising:

first and second hearing aids adapted for being located at or in left and right ears, respectively, of a user, each of the first and second hearing aids comprising:

an input transducer configured to convert an acoustically propagated signal impinging on the input transducer to an electric sound input signal comprising a target signal from at least one target sound source and other signals from other sound sources in an environment around the user;

a wireless receiver configured to receive a wirelessly transmitted signal from an audio transmitter and to retrieve therefrom a streamed audio input signal comprising the target signal from the at least one target sound source and optionally the other signals from the other sound sources in the environment around the audio transmitter;

an input gain controller configured to control a relative weight between the electric sound input signal and the streamed audio input signal and to provide a weighted sum of the electric sound input signal and the streamed audio input signal; and an output transducer configured to convert the weighted sum, or a further processed version thereof, to stimuli perceivable as sound by the user;

the binaural hearing aid system further comprising:

a position detector configured to provide an estimate of a current position of the at least one target sound source relative to the user's head and to provide a position detector control signal indicative thereof;

wherein at least one of the input gain controllers of the first and second hearing aids is configured to provide the relative weight in dependence of the position detector control signal.

2. The binaural hearing aid system according to claim 1, wherein the estimate of the position of the at least one target sound source relative to the user's head comprises an estimate of an angle between a current look direction of the user, and a direction from the user's head to the at least one target sound source.

3. The binaural hearing aid system according to claim 2, wherein the estimate of the look direction and the direction from the user's head to the at least one target sound source is estimated relative to a common reference direction.

4. The binaural hearing aid system according to claim 3, wherein the common reference direction is a direction from the user to the audio transmitter, or a normal forward-looking position relative to the torso of the user.

5. The binaural hearing aid system according to claim 2, wherein the input gain controller is configured to decrease the relative weight with increasing angle.

6. The binaural hearing aid system according to claim 1, wherein the position detector comprises a head tracker configured to track an angle of rotation of the user's head compared to a reference direction to thereby estimate, or contribute to the estimation of, the position of the target sound source relative to the user's head.

7. The binaural hearing aid system according to claim 6, wherein the head tracker comprises a combination of a gyroscope and an accelerometer.

8. The binaural hearing aid system according to claim 1, wherein the position detector comprises an eye tracker allowing to estimate a current eye gaze angle of the user relative to a current orientation of the user's head to thereby finetune the estimation of the position of the target sound source relative to the user's head.

9. The binaural hearing aid system according to claim 1, wherein the estimate of the current position of the at least one target sound source relative to the user's head comprises an estimate of a distance between the at least one target sound source and the user's head.

10. The binaural hearing aid system according to claim 1, wherein the estimate of the current position of the at least one target sound source relative to the user's head comprises an estimate of a distance between the audio transmitter and the wireless receiver.

11. The binaural hearing aid system according to claim 1, wherein the input gain controller is configured to decrease the relative weight with increasing distance.

12. The binaural hearing aid system according to claim 1, wherein the estimate of a position of the target sound source relative to the user's head is provided as a user input.

13. The binaural hearing aid system according to claim 1, wherein each of the first and second hearing aids comprises a monaural audio signal processor configured to apply one or more processing algorithms to the weighted sum of the electric sound input signal and the streamed audio input signal and to provide a processed electric output signal in dependence thereof.

14. The binaural hearing aid system according to claim 1, wherein the position detector is configured to estimate a direction of arrival of sound from the at least one target sound source in dependence of one or more of the electric sound input signal and the streamed audio input signal.

15. The binaural hearing aid system according to claim 1, the binaural hearing aid system further comprising a binaural audio signal processor configured to apply binaural gains to the streamed audio input signals of the first and second hearing aids.

16. The binaural hearing aid system according to claim 15, wherein the binaural audio signal processor is configured to control the binaural gains applied to the streamed audio input signal of the respective first and second hearing aids in dependence of the estimate of the position of the at least one target sound source relative to the user's head.

17. The binaural hearing aid system according to claim 1, the binaural hearing aid system comprising a wireless reception detector configured to provide a reception control signal indicating whether the at least one streamed audio input signal comprising the target signal and optionally the other signals from the other sound sources in the environment around the user are currently received.

18. The binaural hearing aid system according to claim 1, wherein the at least one target sound source comprises sound from a television (TV) transmitted to the binaural hearing aid system via a TV-sound transmitter located together with the TV and/or a sound from one or more person(s) transmitted to the binaural hearing aid system via a microphone unit located at or near the one or more person(s).

19. The binaural hearing aid system according to claim 1, wherein the input transducer comprises a noise reduction algorithm configured to reduce noise in the electric sound input signal and/or wherein the input transducer comprises a multitude of microphones and a beamformer filter configured to provide the electric sound input signal as a beamformed signal in dependence of signals from the multitude of microphones.

20. The binaural hearing aid system according to claim 1, wherein the first and second hearing aids are constituted by or comprises an air-conduction type hearing aid, a bone-conduction type hearing aid, a cochlear implant type hearing aid, or a combination thereof.

21. The binaural hearing aid system according to claim 1, wherein a prioritization between the electric sound input signal picked up by the respective input transducers of the first and second hearing aids and the streamed audio input signal in dependence of the position detector control signal is provided by respective input gain controllers of the first and second hearing aids as respective weighted sums of the electric sound input signal and the streamed audio input signal.

22. A hearing aid adapted for being located at or in an ear of a user, the hearing aid comprising:

an input transducer configured to convert an acoustically propagated signal impinging on the input transducer to an electric sound input signal comprising a target signal from at least one target sound source and other signals from other sound sources in an environment around the user;

a wireless receiver configured to receive a wirelessly transmitted signal from an audio transmitter and to retrieve therefrom a streamed audio input signal comprising the target signal and optionally the other signals from the other sound sources in the environment around the at least one target sound source;

an input gain controller configured to control a relative weight between the electric sound input signal and the streamed audio input signal and to provide a weighted sum of the electric sound input signal and the streamed audio input signal; and an output transducer configured to convert the weighted sum, or a further processed version thereof, to stimuli perceivable as sound by the user;

a position detector configured to provide an estimate of a current position of the at least one target sound source relative to the user's head and to provide a position detector control signal indicative thereof;

wherein the input gain controller is configured to provide the relative weight in dependence of the position detector control signal.

23. A hearing aid system comprising a hearing aid and an audio transmitter, the hearing aid and the audio transmitter being configured to exchange data between them, the hearing aid comprising:

a wireless receiver configured to receive a wirelessly transmitted signal from the audio transmitter and to retrieve therefrom a streamed audio input signal comprising at least one target signal and optionally other signals from other sound sources in the environment around the at least one target sound source;

a position detector configured to provide an estimate of a current position of the at least one target sound source relative to the user's head and provide a position detector control signal indicative thereof;

wherein the hearing aid is configured to transmit the position detector control signal to the audio transmitter;

a wireless transmitter configured to transmit data to the audio transmitter;

the audio transmitter comprising:

an input unit configured to provide at least one electric input signal representing sound;

a wireless audio transmitter configured to transmit data including the at least one electric input signal representing sound to the hearing aid;

a wireless receiver configured to receive data, including the position detector control signal from the hearing aid; and a transmit processor configured to determine a transmitter gain and apply the transmitter gain to the at least one electric input signal in dependence of the position detector control signal.

24. The hearing aid system according to claim 23, wherein the hearing aid further comprises:

an input transducer configured to convert an acoustically propagated signal impinging on the input transducer of the hearing aid to an electric sound input signal comprising the at least one target signal from the at least one target sound source and the other signals from the other sound sources in the environment around the user.

25. The hearing aid system according to claim 23, wherein the audio transmitter comprises a television-(TV) or other video-sound transmitter configured to receive and transmit sound to the hearing aid, or a microphone unit configured to pick up and transmit sound from the at least one target sound sources in the environment of the microphone unit.

26. The hearing aid system according to claim 23, wherein the estimate of the position of the at least one target sound source relative to the user's head comprises an estimate of an angle between a reference direction, and a direction from the user's head to the at least one target sound source.

27. The hearing aid system according to claim 23, wherein the transmitter gain comprises spatial information representing the current position of the at least one target sound source relative to the user's head.

* * * * *